United States Patent
Kunitake et al.

(10) Patent No.: US 7,704,549 B2
(45) Date of Patent: Apr. 27, 2010

(54) NANOMATERIALS OF COMPOSITE METAL OXIDES

(75) Inventors: Toyoki Kunitake, Fukuoka (JP); Izumi Ichinose, Tokyo (JP); Rie Takaki, Asaka (JP); Junhui He, Wako (JP)

(73) Assignee: Riken, Wako-shi (JP)

( * ) Notice: Subject to any disclaimer, the term of this patent is extended or adjusted under 35 U.S.C. 154(b) by 509 days.

(21) Appl. No.: 11/644,942

(22) Filed: Dec. 26, 2006

(65) Prior Publication Data

US 2007/0122545 A1     May 31, 2007

Related U.S. Application Data

(63) Continuation of application No. 10/214,353, filed on Aug. 8, 2002, now abandoned.

(30) Foreign Application Priority Data

| Aug. 8, 2001 | (JP) | ............................. 2001-240847 |
| Dec. 25, 2001 | (JP) | ............................. 2001-392086 |
| Jun. 27, 2002 | (JP) | ............................. 2002-188281 |

(51) Int. Cl.
    *B05D 5/00*     (2006.01)
(52) U.S. Cl. .................. 427/126.3; 427/383.1; 427/458
(58) Field of Classification Search .............. 427/126.3, 427/383.1, 458
See application file for complete search history.

(56) References Cited

U.S. PATENT DOCUMENTS

| 5,137,749 | A | * | 8/1992 | Yamazaki et al. ........... 427/108 |
| 6,503,476 | B1 | | 1/2003 | Suib et al. |
| 6,558,847 | B1 | | 5/2003 | Kawakami et al. |
| 2002/0190251 | A1 | | 12/2002 | Kunitake et al. |

FOREIGN PATENT DOCUMENTS

| JP | 9-241008 A | 9/1997 |
| JP | 2000-7306 A | 1/2000 |
| WO | WO-01/17901 | 3/2001 |

OTHER PUBLICATIONS

He J. et al., Imprinting of Coordination Geometry in Ultrathin Films via the Surface Sol-Gel Process, vol. 79th, No. 1, p. 458 (Mar. 15, 2001).
Junhui He et al.; Chem. Mater. 2002, 14, pp. 3493-3500.
Junhui He et al.; Chemistry Letters, 2001, pp. 850,851.

* cited by examiner

*Primary Examiner*—Steven Bos
(74) *Attorney, Agent, or Firm*—Birch, Stewart, Kolasch & Birch, LLP

(57) ABSTRACT

Exchangeable metal ions are removed from an amorphous composite metal oxide and different metal ions are introduced to manufacture a nanomaterial of composite metal oxide. Based on this method, it is possible to reliably form composite metal oxide nanomaterials over a wide range of compositions.

5 Claims, 10 Drawing Sheets

NANOMATERIALS OF COMPOSITE METAL OXIDES

This application is a Continuation of co-pending application Ser. No. 10/214,353 filed on Aug. 8, 2002, now abandoned and for which priority is claimed under 35 U.S.C. 120; and this application claims priority of Application No. 2001-240847 filed in Japan on Aug. 8, 2001, 2001-392086 filed in Japan on Dec. 25, 2001 and 2002-188281 filed in Japan on Jun. 27, 2002 under 35 U.S.C. 119; the entire contents of all are hereby incorporated by reference.

TECHNICAL FIELD

The present invention relates to nanomaterials of amorphous metal oxides. More particularly, the present invention relates to a technique of manufacturing nanomaterials of composite metal oxides by means of a novel technique of removing exchangeable metal ions from nanopores of an amorphous metal oxide and introducing different metal ions.

RELATED ART

In recent years, nanotechnology has drawn considerable attention as an important scientific technology of the twenty-first century. It is anticipated that the materials having a controlled size, shape, composition, distribution, function, spatial arrangement, and the like at the nanometer level will bring about new electronic, physical, chemical, and biological functions. Bottom-up compound synthesis processes that begin with atoms and molecules are essential to manufacture such nanomaterials. Of these, techniques of designing the composition and structure of nanoparticles and ultra-thin films at the nanometer level have become important basic techniques in a wide range of fields. A general survey of prior art relating to nanomaterials of composite metal oxides comprising two or more metal atoms is given below.

Thin-film materials of composite metal oxides, the thickness of which is controlled at the nanometer level, are anticipated to play important roles in such areas as improving the chemical, mechanical, and optical characteristics of surfaces; catalysts; the separation of materials such as gases; the manufacturing of fuel cells, fluorescent materials, and magnetic materials; the manufacturing of various sensors; and in high-density electronic devices. The next generation of integrated circuit technology requires the production of insulating thin films of extremely high precision, with similar requirements existing for processes used to manufacture high-precision memories and thin-film magnetic memory heads.

Conventionally, composite metal oxide thin films have been fabricated by spin-coating. As required, water and catalysts are added to the mixed solutions of multiple metal alkoxide compounds. By spin-coating these solutions onto substrate surfaces, it is possible to readily manufacture thin films of about one micrometer. It is possible to manufacture thin films of about 100 nm with this method by controlling the concentration and viscosity of the coating solution. However, in the spin-coating, the film thickness is controlled by means of the viscosity of the coating solution and the speed of rotation, making it difficult to obtain ultra-thin films with uniform thicknesses of less than 100 nm. Particularly when employing very large area substrates, the thickness of the film obtained differs from center to edge.

When manufacturing composite metal oxide thin films by spin-coating the mixed solutions of metal alkoxide compounds, a micro phase separation structure is often produced. This becomes a major problem in ultra-thin films of nanometer thickness. This occurs because, due to differences in the hydrolysis rates of the metal alkoxide compounds employed as starting materials, hydrolysis and condensation of metal alkoxide compounds of high reactivity takes place first, forming primary particles of metal oxides, with metal alkoxides of low reactivity forming metal oxides by hydrolysis and condensation around the primary particles. Double alkoxides obtained by reacting in advance two metal alkoxides of different reactivity are commercially available and can be employed as the starting materials of composite metal oxides. However, it is impossible to obtain composite metal oxides in which two components have been uniformly dispersed at the molecular level over a broad range of the compositions. When thin film materials of composite metal oxides having micro phase separated structures are sintered, crystalline composite metal oxide thin films are sometimes obtained. However, the crystallization temperature of oxides is generally high, and the use of sintering processes in applications in which nanostructures play important roles is not easy.

When manufacturing composite metal oxide thin films as structural elements of electronic devices and the like, MOCVD employing multiple metal compounds as starting materials is often employed. Laser abrasion, ion-beam sputtering, and the like are employed in addition to the CVD method in the manufacturing of nano films in which the film thickness and oxide composition are controlled. Methods employing these vacuum techniques have become important in the manufacturing of uniform thin films affording a broad range of selection in pressure, substrate temperature, target, and gas starting materials. However, except the epitaxially grown of composite metal oxides, there are few composite metal oxides wherein the composition and film thickness thereof can be controlled at the nanometer level. This is because metal oxides are not generally suited to CVD, tending to develop minute domains and cracks. Further, even in the epitaxial growth of composite metal oxides, the range of condition settings is narrow, precluding this technique from becoming a practical thin-film manufacturing technique.

Thin film materials of composite metal oxides such as barium titanate can be obtained by electrochemically oxidizing titania crystals in the presence of alkali salts. However, it is difficult to uniformly manufacture ultra-thin films with thicknesses of 100 nm and below when employing such a soft solution process.

In any case, it is impossible over a broad range of compositions to manufacture thin film materials of composite metal oxides in which two components are uniformly distributed at the molecular level by the above-described methods.

Ion implantation into oxide thin films by low-speed ion beam is one method of manufacturing thin film materials of composite metal oxides. However, the amount of metal ions that can be introduced by ion beam is limited. Further, compositional distribution is generated in develop perpendicular to the film surface due to the concentrated introduction of metal ions at a depth corresponding to the energy of the ion beam.

The fabrication of composite metal oxides by impregnation of porous oxide thin films is a method similar to that of the present invention. In prior art, catalysts have been manufactured by methods of impregnation in which metal ions are supported in porous metal oxides. However, in that case, counter anions end up being incorporated in the step incorporating the metal ions. That is, in the method of impregnation into porous metal oxides, minute metal salts are simply incorporated into oxides.

Zeolite compounds and mesoporous materials typified by MCM-41 have regular nanopores and internal exchangeable metal ions such as sodium ions. Under suitable conditions, different metal ions can be introduced into the nanopores of these materials. Thus, zeolite compounds and mesoporous materials have characteristics relating to the thin film materials of the composite metal oxides obtained in the present invention, but they also have the following differences. That is, zeolite compounds having regularly arranged nanopores are crystalline materials, differing from amorphous metal oxides having uniformly dispersed nanopores. Similarly, mesoporous materials in which voids of certain size are regularly arranged are micrometer-level crystalline materials. Due to the crystalline properties of these materials, it is extremely difficult to fabricate thin film materials with good thickness precision in the nanometer range. Further, both zeolite compounds and mesoporous materials are generally obtained by hydrothermal synthesis and sintering, making it impossible to control the quantity of exchangeable metal ions and rendering these compounds and materials unsuitable as precursors for manufacturing composite metal oxides over a wide range of compositions.

Problems to be solved in the manufacturing of thin film materials of composite metal oxides in the nanometer region are the improvement of uniformity in film thickness, the improvement of thin film manufacturing processes at low temperatures, the improvement of adhesion to the substrate, controlling physical characteristics such as insulating properties, and the like. In thin film manufacturing processes at low temperature, in particular, it is possible to avoid heat-induced deterioration in device characteristics such as insulation properties in ultrafine processing techniques, making these processes indispensable in the manufacturing of molecular devices employed in organic materials.

The present inventors conducted extensive research into ultra-thin films, resulting in the development of a novel nanometer thin film manufacturing method named the surface sol-gel process. In the surface sol-gel process, metal alkoxide compounds are chemically adsorbed on a solid substrate having hydroxyl groups on its surface, and then hydrolyzed to manufacture ultra-thin oxide films of molecular thickness. The new hydroxyl groups produced by hydrolysis of the alkoxide groups in the outermost layer can then be used again in chemical adsorption of metal alkoxide compounds. Thus, repeated adsorption and hydrolysis steps permit the manufacturing of metal oxide multilayer films having a nanometer thickness.

In this process, multiple metal alkoxide compounds are employed for the stepwise adsorption, thereby permitting the manufacture of composite metal oxide thin films controlled at the nanometer level. The composition of such films can also be controlled. Further, mixed solutions of metal alkoxide compounds can be used to manufacture similar composite metal oxide thin films.

With the surface sol-gel process, it is possible to manufacture thin films of composite metal oxides on the surface of a wide variety of materials, such as polymers, metals, and organic and inorganic materials having functional groups such as hydroxyl and carboxyl groups that are reactive with metal alkoxide groups. Further, since this process is based on adsorption from solution, it is possible to manufacture uniform composite metal oxide thin films independent of the shape of the substrate.

However, the compounds that can be obtained by the surface sol-gel process are limited to metal oxides capable of chemically bonding to hydroxyl groups on the surface of solids such as metal alkoxide compounds and capable of generating new hydroxyl groups though hydrolysis. Further, chemical adsorption from organic solutions is mainly employed to bring such metal compounds into contact with solid surfaces, making this process unsuitable for insoluble or nonvolatile metal oxides such as the lanthanide series. Still further, since metal alkoxide compounds such as alkali metals and alkaline earth metals cannot form their hydroxyl groups on surfaces by hydrolysis, they are unsuited to application to the surface sol-gel process. For these reasons the range of thin film materials of composite metal oxides that can be manufactured by the surface sol-gel process is limited.

Thus, no satisfactory method of manufacturing thin film materials of composite metal oxides in the nanometer range affording both good thickness precision over a broad range of compositions and reliable formation has yet been developed. Accordingly, the object of the present invention is to provide such a nanomaterial.

SUMMARY OF THE INVENTION

The present inventors thought that if there were replaceable metal ions in metal oxides, it would be possible to introduce various metal ions in replacement of the replaceable metal ions by ion exchange, yielding a broadly applicable method of manufacturing nanomaterials of composite metal oxides.

When manufacturing nanomaterials of composite metal oxides by such a method, it is necessary for replaceable metal ions to be uniformly distributed in a metal oxide serving as matrix. Further, at least a portion of the individual replaceable metal ions present in the metal oxide must be in contact with the metal oxide serving as matrix. That is, if exchangeable metal ions are present within nanopores which are uniformly distributed in a metal oxide, a high degree of dispersion of exchangeable metal ions can be achieved. In that case, the size of the nanopores is desirably about the size of molecules.

In obtaining thin film materials with good thickness precision, it is desirable for the metal oxide serving as matrix to be amorphous. Further, the amorphous metal oxide must be able to retain its shape as a thin film during the elimination of the exchangeable metal ions and the introduction of different metal ions.

The present inventors conducted extensive research into the manufacturing of thin film materials of composite metal oxides based on chemical adsorption from solution and rinsing.

As a result, they discovered that it was possible to manufacture thin film materials of composite metal oxides containing exchangeable metal ions within nanopores uniformly distributed in amorphous metal oxides by combining a metal alkoxide compound providing metal ions soluble in an acidic aqueous solution following hydrolysis and a metal alkoxide compound providing metal oxide insoluble in water following hydrolysis in the process of forming a thin film by the surface sol-gel process. They further discovered that the amorphous metal oxide thin film materials of nanometer thickness manufactured by the surface sol-gel process rapidly adsorbs large quantities of metal ions. They also discovered that when thin film formation by the surface sol-gel process and metal ion adsorption were repeated, it was possible to manufacture a thin film material of composite metal oxide containing exchangeable metal ions in the nanopores uniformly distributed in an amorphous metal oxide. A similar thin film material was possible to be made by contacting an aqueous solution of silicate oligomer with a solid surface. Further, the present inventors discovered that it was possible to remove exchangeable metal ions and introduce different metal ions in such thin film materials.

Accordingly, the present invention provides a nanomaterial of composite metal oxides containing exchangeable metal ions in nanopores uniformly distributed in an amorphous metal oxide. A metal oxide or composite metal oxide nanomaterial manufactured by removing exchangeable metal ions from such materials yields a material in which nanopores that can accept metal ions are uniformly dispersed, permitting the selective incorporation of specific metal ions therein. The present invention further provides a nanomaterial of composite metal oxides that is manufactured by removing exchangeable metal ions and introducing different metal ions. The present invention further provides a nanomaterial of composite metal oxides or amorphous metal oxides in which nanopores containing metal ions soluble in acidic aqueous solutions are uniformly distributed in a metal oxide that is insoluble in acidic aqueous solutions.

When configuring the nanomaterial of the present invention as a thin film, it is desirably formed on a solid surface to a thickness of from 0.5 to 100 nm. The use of a solid surface having positive electric charges or a solid surface having groups reactive with silicate oligomer or metal alkoxide groups is desirable. Further, one embodiment of the nanomaterial of the present invention does not comprise organic ligands coordinated with metal ions through a nitrogen atom, an oxygen atom, a sulfur atom or a phosphorus atom.

The repetition at least one time of the steps of chemically adsorbing a metal alkoxide compound on a solid surface and rinsing is desirable in the manufacturing of a thin film material, and the method of bringing the solid surface into contact with a mixed solution of a metal alkoxide compound providing metal ions soluble in acidic aqueous solutions following hydrolysis and a metal alkoxide compound providing a metal compound insoluble in water following hydrolysis is particularly preferred. That is, when manufacturing a thin film in the present invention, a metal alkoxide compound is chemically adsorbed onto the solid surface, the excess adsorbed metal alkoxide compound is removed by rinsing, and the metal alkoxide compound present on the solid surface is hydrolyzed to form a composite metal oxide thin film, with these steps preferably being repeated one or more times. In the thin film material of the present invention, in place of the mixed solution of the above-described metal alkoxide compounds, a solution of a metal alkoxide compound providing metal ions soluble in acidic aqueous solutions following hydrolysis and a solution of a metal alkoxide compound providing a metal oxide insoluble in water following hydrolysis may be separately employed, and manufacturing may be conducted by implementing one or more times the steps of chemical adsorption of the respective metal alkoxide compounds, rinsing, and hydrolysis.

The thin film material of the present invention may also be manufactured by forming a thin film of amorphous metal oxide of nanometer thickness on the above-described solid surface, immersing this thin film in a solution containing metal ions, and rinsing away the excess adsorbed metal ions. In that case, the surface sol-gel process is the optimum means of manufacturing the thin film of amorphous metal oxide compound of nanometer thickness. That is, the thin film material of the present invention is desirably manufactured by performing one or more times the steps of bringing a metal alkoxide compound providing a metal oxide insoluble in water following hydrolysis into contact with a solid surface having groups reactive with metal alkoxide groups to chemically adsorb the metal alkoxide compound, removing the excess metal alkoxide compound by rinsing, and hydrolyzing the metal alkoxide compound present on the solid surface to form a thin film of metal oxide compound; then immersing the thin film in a solution comprising metal ions and rinsing away the excess adsorbed metal ions. When the steps of forming a thin film of amorphous metal oxide and adsorbing metal ions are repeated, the thin film material of the present invention is obtained with a film thickness restricted to the nanometer level.

The thin film material of the present invention can be manufactured by bringing an aqueous solution of silicate oligomer into contact with a solid having a solid charge or having a surface that is reactive with silicate oligomer to chemically adsorb the oligomer, then rinsing away the excess adsorbed silicate oligomer. Different metal ions can be introduced by ion exchange into the thin film material of composite metal oxide thus obtained. Further, repeating the steps of adsorbing silicate oligomer and introducing metal ions by ion exchange can be repeated to obtain the thin film material of the present invention with a film thickness restricted to the nanometer level.

The thin film materials of the present invention includes thin film materials of composite metal oxides comprising metal components or mixed valence metal oxide components manufactured by chemically reducing or reducing by a physical means such as hydrogen plasma or light-irradiatation treatment of the thin film material obtained by the above-described steps; thin film materials of composite metal oxides comprising metal chalcogenite components manufactured by reaction with a chalcogen compound; thin film materials of composite metal oxides obtained by employing a heat treatment or oxygen plasma treatment to reduce the ion exchange capability of the exchangeable metal ions and thin film materials obtained by repeat oxidation and reduction treatment such as hydrogen plasma treatment and oxygen plasma treatment. Further, the present invention mainly relates to solid surface thin film materials, but nanomaterials of composite metal oxides containing exchangeable metal ions are not necessarily limited to items with thin shapes. For example, the nanomaterial of the present invention can be manufactured as nanoparticles in a solution from which the nanoparticles are then separated by centrifugal separation or the like.

BEST MODES OF IMPLEMENTING THE INVENTION

Figure 1:
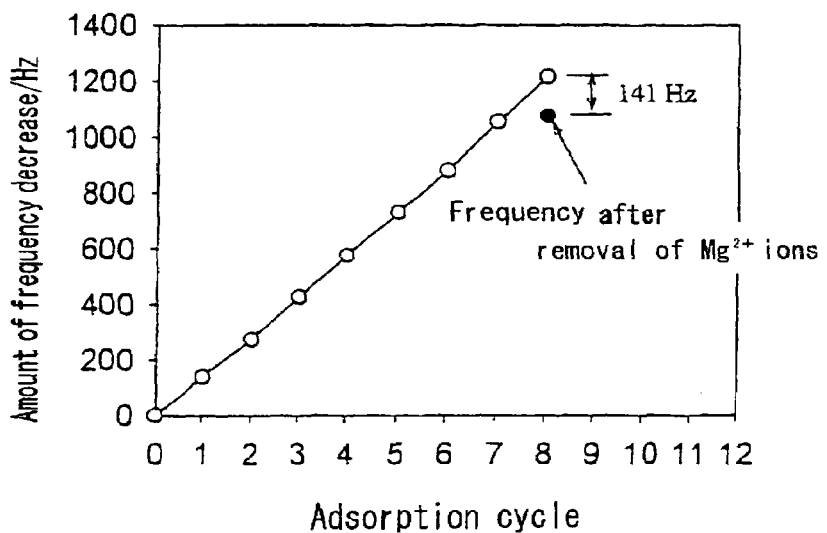
FIG. 1 is a graph showing the change in frequency of a quartz resonator based on stacking of the composite metal oxide thin film of Embodiment 1, and the change in frequency of a quartz resonator due to treatment by immersion in dilute hydrochloric acid and by sodium hydroxide treatment.

The nanomaterial of the composite metal oxide of the present invention is described below. In the present specification, the symbol "-" is used to indicate that the numeric values before and after it are included as minimum and maximum.

The nanomaterial of the composite metal oxide of the present invention is characterized in that an amorphous metal oxide has uniformly distributed nanopores which contain exchangeable metal ions. Here, the term "uniformly distributed nanopores" is used to mean that nanopores in the metal oxide serving as matrix are uniformly distributed throughout the entire material. That is, the nanopores referred to here are such that the material is of uniform composition when evaluated on a scale larger than the size of the nanopores. Further, the size of the nanopores is of about the same size as the molecules in at least one dimension or the thickness and they are not formed by removing some specific component from a microscopic phase-separated structure. Here, the phrase "amorphous metal oxides" is defined to mean that both the arrangement of the atoms constituting the nanomaterial and the arrangement of the nanopores in the nanomaterial are irregular. This states a characteristic structural difference from zeolite compounds and mesoporous materials having periodic holes. At least a portion of the "exchangeable metal ion" referred to herein is in contact with the metal oxide constituting the matrix. The exchangeable metal ions in the amorphous metal oxide serving as matrix are present within the internal space of the above-described nanopores. The nanopores may have various shapes such as dot, line, net, and planar shapes. However, as set forth above, the internal space must be of about the same size as the molecule at least in width or in thickness. Further, when removing one exchangeable metal ion and replacing it with a different ion, the amorphous metal oxide serving as matrix must be able to maintain its shape.

When obtaining a nanomaterial in the form of a thin film in the present invention, the nanomaterial is desirably formed on a solid surface. The type of solid surface is not specifically limited provided that it permits the formation of a thin layer thereon. Considering that many of the thin film materials of the present invention are desirably manufactured with metal alkoxide compounds, the use of a solid having groups reactive with metal alkoxide groups is desirable. Hydroxyl groups and carboxyl groups are preferred groups reactive with metal alkoxide groups. The material making up the solid is not specifically limited and examples of materials suitable for use include various materials such as organic, inorganic, and metal materials. Specific examples are glass, titanium oxide, silica gel, and other solids comprised of inorganic materials; solids comprising organic compounds such as polyacrylic resin, polyvinyl alcohol, cellulose, and phenol resins; and metals with surfaces characterized by ready oxidation, such as iron, aluminum, and silicon.

When forming the thin film material of the present invention on a solid having no reactive groups (for example, cadmium sulfide, polyaniline, or gold), it is recommended that hydroxyl groups or carboxyl groups be incorporated into the solid surface in advance. Hydroxyl groups can be incorporated by known methods without restriction. For example, hydroxyl groups can be introduced to a gold surface by adsorption of mercaptoethanol or the like. Further, carboxyl groups can be introduced to substrate surfaces having cationic charges by extremely thin adsorption of anionic polymer electrolytes such as polyacrylic acid.

The quantity of hydroxyl groups or carboxylic groups present on the solid surface affects the uniformity of the thin film material of composite metal oxide that is to be formed. Thus, to form a good thin film of composite metal oxide in the present invention, the groups that are reactive with the solid surface (particularly hydroxyl groups and carboxyl groups) are generally present in a quantity of from $5.0 \times 10^{13}$ to $5.0 \times 10^{14}$ equivalent/$cm^2$, preferably from $1.0 \times 10^{14}$ to $2.0 \times 10^{14}$ equivalent/$cm^2$.

Further, considering that the thin film material of the present invention can also be manufactured using an aqueous solution of silicate oligomer, the use of a solid capable of adsorbing the silicate oligomer employed is desirable. Solid surfaces having cationic charges and the surfaces of metal oxides on which hydroxyl groups are present may be suitably employed to that end.

The shape and surface form of the solid are not specifically limited. That is, so long as a thin film material of composite metal oxide can be formed by chemical adsorption from a solution and rinsing, there is not a requirement that the solid surface be smooth. Thus, the thin film material of the present invention may be formed on a variety of solid surfaces, such as the solid surfaces of various items such as textiles, beads, powder, and thin pieces, as well as on the inner walls of tubes and filters, on the inner surfaces of porous materials, and items of even larger surface area. Although not a specific limitation, it is possible to form the thin film material of the present invention on metal oxide thin films formed by methods such as the surface sol-gel process.

The method of forming the composite metal oxide thin film of the present invention on these solid surfaces is not specifically limited. However, examples of preferred methods are a method employing a combination of several metal alkexides (referred to as "Method A" hereinafter), a method employing a combination of a metal alkoxide compound and metal ions (referred to as "Method B" hereinafter), and a method employing a water-soluble silicate oligomer (referred to as "Method C" hereinafter).

[Method A]

In Method A, a metal alkoxide compound providing metal ions soluble in acidic aqueous solutions following hydrolysis and a metal alkoxide compound providing a metal oxide insoluble in water following hydrolysis are desirably combined for use.

The "metal alkoxide compound providing metal ions soluble in acidic aqueous solutions following hydrolysis" that is employed in the present invention may be any known compound having such characteristics. Examples of typical compounds include metal alkoxide compounds comprising alkaline earth metals such as magnesium ethoxide ($Mg(OCH_2CH_3)_2$), calcium methoxyethoxide ($Ca(OCH_2CH_2OCH_3)_2$), and barium isopropoxide ($Ba(O^iPr)_2$); metal alkoxide compounds comprising alkali metals such as lithium ethoxide ($LiOCH_2CH_3$); metal alkoxide compounds comprising alkali metals such as potassium ethoxide ($KOCH_2CH_3$) and sodium ethoxide ($NaOCH_2CH_3$); metal alkoxide compounds comprising lanthanide series metals such as lanthanum methoxymethoxide ($La(OCH_2CH_2OCH_3)_3$); and metal alkoxide compounds comprising transition metals, such as copper ethoxide ($Cu(OCH_2CH_3)_2$).

The "metal alkoxide compound providing metal oxide insoluble in water following hydrolysis" that is employed in the present invention may be any known compound having such characteristics. Examples of typical compounds include metal alkoxide compounds such as titanium butoxide ($Ti(O''Bu)_4$), zirconium propoxide ($Zr(O''Pr)_4$), aluminum butoxide ($Al(O''Bu)_3$), niobium butoxide ($Mb(O''Bu)_5$), and tetramethoxysilane ($Si(OMe)_4$); metal alkoxide compounds having two or more alkoxide groups such as methyltrimethoxysilane ($MeSi(OMe)_3$); and metal alkoxide compounds comprising two types of metal ions, such as $BaTi(OR)_x$.

In Method A of the present invention, in addition to the above-described metal alkoxide compound, an oligomer of metal alkoxide compound obtained by partially hydrolyzing and condensing the alkoxide by the addition of a small amount of water may be employed. However, the combination of metal alkoxide compounds sometimes results in the formation of fine particles exceeding the nano size range due to the addition of an excess amount of water. In such cases, they cannot be employed as the metal alkoxide compound of the present invention. That is because the formation of large fine particles results in a thin film material having a phase-separated structure, precluding the uniform dispersion of nanopores.

One preferred method employed as Method A is to chemically adsorb a metal alkoxide compound by bringing a mixed solution of the two above-described metal alkoxide compounds in contact with a solid surface having groups reactive with metal alkoxide groups.

Any method of saturation adsorption on the solid surface can be employed without limitation in the contacting of the mixed solution of metal alkoxide compounds. Generally, the solid is either immersed in the mixed solution, or the solution is suitably coated on the solid surface by a method such as spin-coating. The solvent employed in this process is not specifically limited. For example, methanol, ethanol, toluene, propanol, or benzene may be employed singly or in combination.

The concentration of the "metal alkoxide compound providing metal ions soluble in acidic aqueous solutions following hydrolysis" is desirably from about 1 to 100 mM. Further, the concentration of the "metal alkoxide compound providing metal oxide insoluble in water following hydrolysis" is desirably from about 5 to 500 mM. The compositional ratio of the two cannot be specified once for all conditions, but the "metal alkoxide compound providing metal oxide insoluble in water following hydrolysis" is desirably employed in an excess quantity of from about 5 to 20 times the quantity of "metal alkoxide compound providing metal ions soluble in acidic aqueous solutions following hydrolysis". The contact period and temperature vary with the activity of the metal alkoxide compound employed and cannot be specified once for all conditions, but in general the selection of a contact period of from one minute to several hours and the selection of a temperature of from 0 to 100° C. are generally adequate.

Saturated adsorption of the "metal alkoxide compound providing metal oxide insoluble in water following hydrolysis" and the "metal alkoxide compound providing metal ions soluble in acidic aqueous solutions following hydrolysis" against the hydroxyl or carboxyl groups of a solid surface are achieved by the above-described contact step. At the same time, metal alkoxide compounds are present due to physical adsorption. Achieving a uniform and homogeneous thin film may require removing the excess adsorbed metal alkoxide compound.

The method of removing the excess metal alkoxide compound may be any method of selectively removing the metal alkoxide compound, without limitation. For example, rinsing with the above-listed organic solvents is a suitable method. Rinsing may be conducted by immersion rinsing in the organic solvent, spray rinsing, vapor rinsing, or the like. The temperature employed in the above-described contact step may be suitably employed for rinsing.

Upon hydrolyzing, the "metal alkoxide compound providing metal oxide insoluble in water following hydrolysis" and "metal alkoxide compound providing metal ions soluble in acidic aqueous solutions following hydrolysis" that have been chemically adsorbed onto the solid surface condense to form a thin film material of composite metal oxides.

This hydrolysis may be conducted by known methods without specific limitation. For example, the most common operation is to immerse in water the solid on which have been adsorbed the above-described metal alkoxide compounds. The water employed is desirably ion-exchange water to prevent the introduction of impurities and the like and to produce high-purity metal oxides. It is also possible to immerse the solid on which has been adsorbed the metal alkoxide compound in an organic solvent containing a small amount of water to conduct hydrolysis. Further, when employing a combination of metal alkoxide compounds that are highly reactive with water, hydrolysis can be conducted by reaction with the water vapor in air.

As needed, following hydrolysis, the surface can be dried with a drying gas such as nitrogen gas, yielding the thin film material of composite metal oxides of the present invention.

In Method A, the thickness of the composite metal compound can be adjusted at the nanometer level by repeating the above series of steps one or more times. That is, hydrolysis generates on the surface of the thin film new hydroxyl groups capable of reacting with metal alkoxide compounds. By repeating chemical adsorption through contact of the metal alkoxide compounds with the surface hydroxyl groups, removal of excess adsorbed alkoxides, and hydrolysis, it is possible to conduct nanometer level adjustment of the film thickness of the thin film material of composite metal oxides.

In Method A, the "metal alkoxide compound providing metal oxide insoluble in water following hydrolysis" and "metal alkoxide compound providing metal ions soluble in acidic aqueous solutions following hydrolysis" may be prepared as separate solutions and the above-described series of steps conducted with the respective metal alkoxide compound solutions to produce the thin film material of composite metal oxides. For example, after chemically adsorption through contact of the "metal alkoxide compound providing metal oxide insoluble in water following hydrolysis" with the solid, removing the excess adsorption material, and conducting the hydrolysis step, the solid surface is brought into contact with the "metal alkoxide compound providing metal ions soluble in acidic aqueous solutions following hydrolysis" to conduct chemical adsorption, the excess adsorption material is removed, and hydrolysis is conducted to obtain the thin film material of composite metal oxides. Although there is no specific limitation to the adsorption sequence, adsorption of the "metal alkoxide compound providing metal ions soluble in acidic aqueous solutions following hydrolysis" cannot be consecutively conducted three or more times. This is because the consecutive adsorption of the "metal alkoxide compound providing metal ions soluble in acidic aqueous solutions following hydrolysis" produces a thin film material having a phase separated structure, precluding uniform dispersion of nanopores.

By means of the above-described steps, a thin film material of composite metal oxides containing exchangeable metal ions in the fine pores of an amorphous metal oxide having uniformly distributed nanopores is formed on a solid surface. The thickness of the thin film material varies with the type of metal alkoxide compounds employed and the manufacturing conditions, but in general, conducting one cycle of the series of steps of chemical adsorption, rinsing, and hydrolysis yields a good thin film having a thickness of from 0.5 to 5 nm, and often yields a thin film having a thickness of from 0.5 to 2.0 nm.

Although not falling under any theory, the formation of nanopores within the amorphous metal oxide by the step of Method A is attributed to the following principles.

That is, in Method A of the present invention, the thin film material of the composite metal oxide is formed by hydrolysis of the adsorbed film of metal alkoxide compound of molecular thickness. When a mixed solution of the "metal alkoxide compound providing metal oxide insoluble in water following hydrolysis" and "metal alkoxide compound providing metal ions soluble in acidic aqueous solutions following hydrolysis" is employed as the solution of metal alkoxide compounds, these metal alkoxide compounds are uniformly adsorbed onto the solid surface. Even assuming that two types of metal alkoxide compounds adsorbed nonuniformly onto the solid surface and formed domains, the surface adsorbed metal alkoxide compounds have a film thickness on the molecular level. When the adsorption film of these metal alkoxide compounds is hydrolyzed, a thin film of composite metal oxides is obtained. At that time, the individual alkoxide compounds are chemically adsorbed to the solid surface and cannot change position. Accordingly, the domains of the metal oxides have a thickness of molecular level. Accordingly, when the ratio of "metal alkoxide compound providing metal oxide insoluble in water following hydrolysis" against "metal alkoxide compound providing metal ions soluble in acidic aqueous solutions following hydrolysis" is high, the metal ions produced by the latter metal alkoxide compounds are enclosed in a matrix of metal oxide compounds originating from the "metal alkoxide compound providing metal oxide insoluble in water following hydrolysis."

Similarly, in the case of thin film materials of composite metal oxides manufactured by stacking metal oxide thin films of the respective solutions of "a metal alkoxide compound providing metal oxide insoluble in water following hydrolysis" and "a metal alkoxide compound providing metal ions soluble in acidic aqueous solutions following hydrolysis", the layer of "metal alkoxide compound providing metal ions soluble in acidic aqueous solutions following hydrolysis" is formed in two dimensions, preventing the formation of micro phase-separated structures.

The composite metal oxide thin film formed by Method A in the present invention has a structure in which nanosize regions of the metal oxides containing the "metal alkoxide compound providing metal ions soluble in acidic aqueous solutions following hydrolysis" are formed in a matrix of "water-insoluble metal oxides". When such a composite metal oxide thin film is immersed in an acidic aqueous solution, the metal ions that are soluble in acidic aqueous solutions are removed, protons compensating for the lost cationic charges are incorporated, and a thin film material of metal oxides is obtained. When it is desirable to remove the metal ions under moderate conditions, it is possible to leave some level of metal ions that are soluble in acidic aqueous solutions in the metal oxide thin film.

The metal ions may be removed by immersion for several hours in an aqueous solution of from pH 2 to 6, and in many cases, immersion for several hours in an aqueous solution of from pH 3 to 4 affords adequate removal.

After removing the metal ions that are soluble in the acidic aqueous solution, different metal ions can be introduced into the composite metal oxide manufactured by Method A to produce a new composite metal oxide. Although not a limitation, the method of immersing a solid having composite metal oxides on its surface manufactured by Method A in an aqueous solution of metal salts is preferably employed.

The type of metal ion incorporated here is not specifically limited provided that it be present in water as cation. Examples of metal salt compounds with metal ions dissolving in water as cation include chromium nitrate ($Cr(NO_3)_3$), manganese nitrate ($Mn(NO_3)_2$), ferric nitrate ($Fe(NO_3)_3$), cobalt nitrate ($Co(NO_3)_2$), and other salts of primary transition metals; palladium nitrate ($Pd(NO_3)_2$), silver nitrate ($AgNO_3$), cadmium nitrate ($Cd(NO_3)_2$), and other salts of secondary transition metals; lanthanum nitrate ($La(NO_3)_3$), gadolinium nitrate ($Gd(NO_3)_3$), and other salts of lanthanite metals, barium nitrate ($Ba(NO_3)_2$), calcium nitrate ($Ca(NO_3)_2$) and other salts of alkaline earth metals; and potassium nitrate ($KNO_3$), lithium nitrate ($LiNO_3$), and other salts of alkali metals. Counter anions of compounds providing metal cations in water are not specifically limited. One example thereof is sodium hydroxide (NaOH).

The duration of immersion of the solid having composite metal oxides on its surface manufactured by Method A in the aqueous solution of a metal salt is suitably determined within a range of from one minute to 24 hours, and the immersion temperature is desirably from 0 to 100° C. The metal salt is desirably employed in a concentration of from 1 to 100 mM, preferably a concentration of about 10 mM.

The quantity of metal ions incorporated depends on the quantity of "metal ion soluble in acidic aqueous solutions" in the composite metal oxide manufactured by Method A, as well as on the duration of the step of incorporating the metal ions and the concentration of the metal salt. Following adequate immersion, the quantity of metal ion incorporated becomes equivalent to the quantity of "metal ions soluble in acidic aqueous solution" initially present. However, in the case of metal ions readily undergoing olation, such as iron ions, since the charge of the metal ions diminishes per unit quantity due to olation, a quantity of metal ions greater than the quantity of "metal ions soluble in acidic aqueous solutions" present in the composite metal oxides manufactured by Method A is incorporated.

The embodiments described further below can be consulted for the details of methods of removing these "exchangeable metal ions" and methods of incorporating other metal ions.

[Method B]

In Method B, a thin film material of composite metal oxides is formed by forming an amorphous metal oxide thin film of nanometer thickness on a solid surface, immersing the thin film in a solution containing metal ions, and rinsing away excess adsorbed metal ions. In this case, the surface sol-gel process is the optimum means of forming the amorphous metal oxide thin film of nanometer thickness. In Method B, when manufacturing an amorphous metal oxide thin film of nanothickness by the surface sol-gel process, it is desirable to employ a "metal alkoxide compound providing metal oxide insoluble in water following hydrolysis" as described in the implementation mode of Method A.

When employing the above-described metal alkoxide compound as the means of manufacturing an amorphous metal oxide thin film of nanometer thickness in Method B, the metal alkoxide compound is chemically adsorbed by bringing a solution of the metal alkoxide compound into contact with a solid surface which possesses groups reactive with metal alkoxide groups. Here, the solvent used for the metal alkoxide compound, contact duration, contact temperature, and concentration of the metal alkoxide compound may be selected within ranges such as those described for the implementation mode of Method A. After conducting the contact step, a rinsing step and hydrolysis step such as those conducted in the implementation mode of Method A are performed. Following hydrolysis, as needed, the surface is dried with a drying gas such as nitrogen gas. In Method B, repeating the above-described series of steps permits controlling the thickness of the amorphous metal oxide thin film at the nanometer level. Further, when a "metal alkoxide compound providing metal oxide insoluble in water following hydrolysis" is combined for use, it is possible to stack two or more layers of different amorphous metal oxides of nanothickness that are insoluble in water.

Next, the solid having an amorphous metal oxide thin film of nanometer thickness is immersed in a solution containing metal ions and new metal ions are introduced to obtain a thin film material of composite metal oxide in Method B of the present invention. The type of metal ion introduced in Method B is desirably the type of metal ion described in the implementation mode of Method A.

The duration of the period of immersion in solution comprising metal ions of the solid having an amorphous metal oxide thin film of nanometer thickness in Method B may be selected from within a range of from one minute to 12 hours and immersion is desirably conducted at a temperature of from 0 to 80° C. The metal ions are desirably employed at a concentration of from 1 to 100 mM, preferably at a concentration of about 10 mM.

In Method B, repeating the steps of forming the above-described amorphous metal oxide thin film of nanometer thickness and introducing metal ions makes it possible to control the thickness of the composite metal oxide at the nanometer level.

Although not falling under any theory, the incorporation of metal ions within the amorphous metal oxide thin film of nanometer thickness by the above-described steps is attributed to the following principles.

In the surface sol-gel process, a thin film of molecular thickness is formed by chemical adsorption of a metal alkoxide compound and hydrolysis. An extremely flexible metal-oxygen bond network is formed on the surface and in the immediate area of such thin films, with numerous hydroxyl groups present. The protons of these hydroxyl groups can be exchanged with metal ions. Accordingly, in the case of an extremely thin nanofilm, the amorphous metal oxide thin film becomes an ion-exchangeable thin film. As is indicated in the embodiments, the steps of forming an amorphous metal oxide thin film of nanothickness and of introducing metal ions can be repeated to grow a thin film in which metal ions are incorporated into an amorphous metal oxide thin film of nano thickness, yielding an overall uniform composite metal oxide thin film.

The metal ions introduced through ion exchange of the protons of the hydroxyl groups in the amorphous metal oxide thin film can be removed by immersion in an acidic aqueous solution. When the thin film is immersed in a solution containing different metal ions, the other metal ions can be introduced. The embodiments described further below may be consulted for details regarding the method of removing metal ions and the method of introducing different metal ions.

[Method C]

In Method C, a solid surface having positive charges or groups reactive with silicate oligomer is brought into contact with an aqueous solution of silicate oligomer to chemically adsorb the oligomer, after which the excess oligomer is removed by rinsing to manufacture a thin film material of composite metal oxide. As set forth above, the surface of a metal oxide having hydroxyl groups manufactured by the surface sol-gel process is preferably employed as the solid surface having groups reactive with the silicate oligomer.

An aqueous solution of sodium silicate ($Na_2SiO_3$) is preferably employed as the aqueous solution of silicate oligomer. Sodium silicate has an anionic oligomer structure in which orthosilicate is partially condensed, and has sodium ions as counter ions. Further, in addition to sodium silicate, other metal ions such as potassium silicate and lithium silicate can be employed in the aqueous solution of silicate oligomer.

Further, in Method C of the present invention, in addition to the above-described aqueous solution of silicate oligomer, small quantities of acid may be added to the aqueous solution of silicate oligomer, and a solution in which silicate oligomer condensed may also be employed.

The method of saturation adsorption of silicate oligomer on the solid surface by the contacting of the aqueous solution is not specifically limited. The concentration of the silicate oligomer in the above-described solution is desirably about from 1 to 100 mM based on silicon. The contact period may generally be selected from about one minute to one hour, and the contact temperature from 0 to 50° C.

The above-described contact step causes a saturation adsorption of silicate oligomer against the positive charges or hydroxyl groups of the solid surface, with silicate oligomer being simultaneously present through physical adsorption. Obtaining a uniform and homogeneous thin film sometimes requires the removal of the excess adsorbed silicate oligomer. The method of rinsing with ion-exchange water is a preferred method of removing excess silicate oligomer. Further, the temperature employed in the above-described contact step is desirably employed as the rinsing temperature. As required, following rinsing, the surface may be dried with a drying gas such as nitrogen gas. Thus, a thin film material of composite metal oxide can be obtained by Method C of the present invention.

By the above-described steps, a thin film material of composite metal oxides containing exchangeable metal ions in the uniformly dispersed nanopores of amorphous silicate is formed on a solid surface. The thickness of the thin film material varies with the concentration of the silicate oligomer employed, and quantity of acid added, but a good thin film with a film thickness of from 0.5 to 2 nm can generally be obtained.

Although not falling under any theory, the formation of nanopores in the amorphous silicate by the steps of Method C is attributed to the following principles.

The thin film material of composite metal oxides obtained by Method C of the present invention is formed from an adsorbed film of silicate oligomer with molecular thickness. Originally, silicate oligomer having anionic charges possesses metal ions (such as sodium ions) as counter anions. Following the step of rinsing with ion-exchange water, the silicate oligomer is partially protonated and condensed, thereby forming a two-dimensional silicate network structure on the solid surface with metal ions being uniformly dispersed within the network. The reason the metal ions and silicate do not form a microscopic phase separation structure is that the state in which the metal ions are uniformly and molecularly distributed is electrostatically stable. As is indicated in the embodiments, a large quantity of exchangeable metal ions is present in the thin film of silicate having a network structure. These metal ions can be removed by immersion in an acidic aqueous solution such as described above in the implementation mode of Method A.

When a solid having on its surface a thin film of composite metal oxide manufactured according to Method C is immersed in an aqueous solution of different metal ions, it is possible to incorporate the different metal ions into the thin film. The types of metal ions that can be incorporated here are identical to those in Method A. The immersion period here may be selected within a range of from 1 to 10 minutes and the immersion temperature is desirably from 0 to 50° C. An aqueous solution with a concentration of metal ions from 1 to 100 mM is desirably employed to introduce the metal ions.

As indicated in the embodiments, when metal ions of bivalent or large positive charge such as lanthanum ions ($La^{3+}$) are incorporated into the thin film material of composite metal oxide manufactured by Method C, the charge in the surface layer of the thin film reverses and the composite metal oxide obtained becomes positively charged. The step of manufacturing a thin film material of composite metal oxide by Method C on such a positively charged surface can be repeatedly conducted. That is, positive charges are generated on the surface of the thin film of composite metal oxides due to adsorption of divalent or more positively charged metal ions enough to adsorb silicate oligomers having anionic charges.

By repeating the step of manufacturing a thin film by Method C, it is possible to adjust at the nanometer level the film thickness of the thin film material of composite metal oxides.

The nanomaterial of the present invention can be manufactured as a thin film on a solid substrate by Methods A through C above. However, the nanomaterial of the present invention does not necessarily assume the form of a thin film, and may assume a variety of forms, such as granular, linear, and lattice-like forms. For example, when the portion having groups reactive with metal alkoxide compounds is present as a dot form in a limited region of a solid surface, a dot-shaped nanomaterial can be manufactured by the present invention. The surfaces of nanoparticles can be employed to manufacture granular nanomaterials. That is, in the present invention, the facts that uniformly dispersed nanopores are present in amorphous metal oxides, that it is possible to access metal ions in the pores, and that the size of the material is within the nanometer range are important; the shape thereof is not limited.

When at least some of the metal atoms of the nanomaterial manufactured by Methods A through C are reduced, a nanomaterial of composite metal oxides comprising a metal component or mixed valance metal oxide component is obtained. Here, the reduction is achieved by to known methods without limitation. For example, when a nanomaterial containing exchangeable silver ions is mixed with aqueous hydrazine, a nanomaterial containing silver nanoparticles is obtainable. The surface of nanomaterials can be reduced by the hydrogen plasma or light irradiation method.

[Method D]

In general, the nanomaterial of the present invention permits the manufacturing of nanoparticles in solution. The method of forming nanogranular composite metal oxides in the present invention is not specifically limited. One example of a preferred method is a method employing multiple metal alkoxide solutions (referred to as "Method D" hereinafter).

In Method D, it is desirable to combine the metal alkoxide compound providing metal ions soluble in acidic aqueous solutions with the metal alkoxide compound providing metal oxide insoluble in water following hydrolysis as described in Method A.

One preferred form of Method D is to dissolve the above-described alkoxides in an organic solvent and add a small quantity of water to conduct partial hydrolysis. The organic solvent is not specifically limited; methanol, ethanol, propanol, benzene and the like may be employed singly or in combination. The concentration of the "metal alkoxide compound providing metal ions soluble in acidic aqueous solutions following hydrolysis" in the above-described solution is desirably about from 1 to 100 mM. Further, the concentration of the "metal alkoxide compound providing metal oxide insoluble in water following hydrolysis" is desirably about from 5 to 500 mM. Although the compositional ratio of the two is not comprehensively limited, the "metal alkoxide compound providing metal oxide insoluble in water following hydrolysis" is desirably employed in an excess quantity of from 5 to 20 times the quantity of "metal alkoxide compound providing metal ions soluble in acidic aqueous solutions following hydrolysis". Further, the quantity of water added to hydrolyze these metal alkoxide compounds is desirably a quantity that partially hydrolyzes the metal alkoxides.

The "partial hydrolysis" referred to here refers to the conducting of hydrolysis with a quantity of water smaller than the quantity that is stoichiometrically required to hydrolyze the metal alkoxide compounds into metal oxides. For example, titanium butoxide ($Ti(O^nBu)_4$) is reacted with a double molar quantity of water to produce titanium oxide and ethanol. When titanium butoxide (Ti(O"Bu)$_4$) is reacted with a quantity of water less than a double molar quantity, the titanium butoxide (Ti(O"Bu)$_4$) does not completely hydrolyze, but only partially hydrolyzes. Although an overall limitation cannot be given, the quantity of water added in Method D is desirably slightly in excess of the quantity required for stoichiometric hydrolysis of the metal alkoxides.

The reaction temperature and duration of the above-described solution varies with the activity of the metal alkoxide compounds employed and cannot be limited comprehensively for all conditions. However, the temperature can generally be determined within a range of from one minute to several hours and the temperature within a range of from 0 to 100° C.

The "metal alkoxide compound providing metal oxide insoluble in water following hydrolysis" and the "metal alkoxide compound providing metal ions soluble in acidic aqueous solutions following hydrolysis" are partially hydrolyzed in the organic solvent and condensed based on the above-described step to form nanoparticles of composite metal oxides. The size of these nanoparticles varies with the reaction conditions and quantity of water added, but nanoparticles from 1 to 500 nanometers can generally be produced.

Although not falling under any theory, the formation of nanopores within the amorphous metal oxide by the step of Method D is attributed to the following principles.

In the nanomaterial of composite metal oxides obtained by Method D of the present invention, the partial hydrolysis of the "metal alkoxide compound providing metal oxide insoluble in water following hydrolysis" and the "metal alkoxide compound providing metal ions soluble in acidic aqueous solutions following hydrolysis" yields nanoparticles containing the both components. Here, when the "metal alkoxide compound providing metal oxide insoluble in water following hydrolysis" is added in excess of the "metal alkoxide compound providing metal ions soluble in acidic aqueous solutions following hydrolysis", the metal ions produced from the latter metal alkoxide compounds are enclosed in the matrix of nanosized metal oxide originating from the former metal alkoxide compounds.

In the nanoparticles of composite metal oxide formed by Method D of the present invention, the nanosize region of metal oxide containing the "metal ions soluble in acidic aqueous solutions" are formed within the matrix of "metal oxide insoluble in water". When an acidic aqueous solution is added to a solution containing such nanoparticles, the metal ions soluble in acidic aqueous solutions can be removed. Here, depending on the conditions, the nanoparticles sometimes aggregate. It is clear that, the nanoparticles formed by Method D have the exchangeable metal ions that characterize the nanomaterial of the present invention.

The metal ions are desirably removed by adding a 1 to 10 normal aqueous hydrochloric acid. The nanoparticles of metal oxide obtained can be separated by a method such as centrifugal separation.

After removing the metal ions by the addition or the acidic solution, different metal ions can be introduced to the nanoparticles of composite metal oxide manufactured by Method D to produce new nanoparticles of composite metal oxide.

The metal oxide compounds employed in Method A are desirably employed as the metal ions here.

Further, although the method of adding a metal salt is not specifically limited, the addition of a saturated methanol solution of metal salt is desirable. The nanoparticles of composite metal oxide obtained can be separated by a method such as centrifugal separation.

The nanomaterials manufactured by Methods A through D can be reacted with chalcogen compounds to obtain nanomaterials of composite metal oxide containing a metal chalcogenite component. Any known reaction methods can be employed here without specific limitation. For example, a nanomaterial containing exchangeable cadmium ions can be mixed with an aqueous solution of sodium sulfide to obtain a nanomaterial containing cadmium sulfide. In the cares or nanomaterials on solid surfaces a gaseous chalcogen compound such as hydrogen sulfide gas can be exposed to react with them.

Further, the nanomaterials manufactured by Methods A through D can be heat treated or oxygen plasma treated to manufacture nanomaterials of composite metal oxides in which the ion-exchange capability of the exchangeable metal ions is diminished.

Some or all of the metal atoms constituting the nanomaterials manufactured by Methods A through D can be reduced to manufacture a material of a composite metal compound containing a metal component or a mixed valence metal oxide component. Further, conducting a subsequent oxidation treatment permits the re-oxidation of at least a portion of the metal component or mixed valence metal oxide component. Further, after conducting such a reducing step and re-oxidation step, by alternating the reducing step and the oxidation step in that order one or more times, the size and standard deviation of the nanoparticles can be controlled. Here, the phrase "alternating the reducing step and the oxidation step in that order one or more times" includes the case where just a reduction step is conducted; the case where an oxidation step is conducted after a reduction step, the case where a reduction step, an oxidation step, and a reduction step are conducted in that order; and the case where four or more steps are alternately performed in the order of reduction step followed by oxidation step. Preferred examples of reduction steps and oxidation steps are hydrogen plasma treatment and oxygen plasma treatment.

The embodiments described further below may be referred to for methods of manufacturing novel nanomaterials by reducing, reacting, heat treating, or plasma treating the nanomaterials manufactured by Methods A-D. However, the scope of the present invention is not limited to the methods of the embodiments described further below.

The principal characteristics and industrial applications of the nanomaterials of the present invention are as follows.

The present invention provides nanomaterials of composite metal oxides with a wide range of different compositions and structures. Further, it is possible to reliably manufacture nanomaterials of composite metal oxides on surfaces of every conceivable shape, patterned surfaces, and large surface area substrates by means of simple steps under moderate conditions based on adsorption from solution.

The nanomaterials of composite metal oxides can yield materials with different physicochemical characteristics and electronic characteristics from previous metal oxide materials. Composite metal oxides exhibit a broad range of electrinic properties, from insulators to conductors depending on the combination of metal ions, permitting the manufacturing of conductive materials, insulating materials, dielectrics, and the like. Quantum effects are anticipated from semiconducting materials in the nanometer range. In particular, these effects are significant in dot-shaped or particulate nanomaterials. Further, thin film materials containing large quantities of lanthanide metals such as gadolinium are expected to become magnetic memory materials in the next generation. Further, controlling the refractive index of composite metal compounds is expected to yield thin film materials having new optical characteristics. Further, introducing metal ions having light-emitting characteristics such as europium relates to the development of new light-emitting materials, and the use of composite metal oxides containing photosensitive ions such as silver ions a can be anticipated to be photomemory materials. Further, the use of thin film materials of composite metal oxides that absorb ultraviolet and visible light is anticipated to capture light energy and as photoelectric converters. Further, the introduction of metal ions having catalytic activity such as transition metal ions permits the development of highly efficient catalytic materials. Since the composite metal oxide of the present invention contains an exchangeable metal ion, applications as ion-exchange materials, ion-extracting materials, and ion sensors can be anticipated, with the possibility of development as a gas sensor. In particular, when a thin film material of amorphous metal oxide containing nanopores of the present invention is formed on the surface of a porous substrate, the separation utilizing the ion-exchange characteristics thereof becomes possible. Not only are applications as an ion-exchange material possible, but applications as a means of electrochemical synthesis or in fuel cells become possible. The ion-exchange characteristics of the metal ions may also be employed in methods of manufacturing batteries of nanothickness. Further, the use of the metal ions dispersed in the nanopores of the metal oxide matrix as precursors in material synthesis yields nanometer level fine particles and permits the manufacturing of thin film materials with highly dispersed magnetic particles and of thin film materials having plasmon absorbing properties. Due to the good mechanical characteristics, thermal stability, and chemical stability of composite metal oxides, they also become useful as coating reagent on the surfaces of materials. It also becomes possible to control the molecular adsorption characteristics and wetting properties of material surfaces by means of thin films of composite metal oxides. That is, the use of thin films of composite metal oxides is to be anticipated in the field of molecular organization using small molecules, polymers, supermolecules, biomolecules, inorganic microparticles, and organic microparticles.

EMBODIMENTS

The characteristics of the present invention are described more specifically below through embodiments. The materials, used quantities, proportions, treatment contents, treatment procedures, and the like indicated in the embodiments below may be suitably modified without departing from the essence of the present invention. Accordingly, the scope of the present invention is not to be interpreted as being limited by the specific examples given below.

In the embodiments below, in order to show the sequential, constant-quantity stacking of thin film materials of composite metal oxides, the thin film materials were formed on quartz resonators and the increase in the weight of the thin film was estimated from the change in frequency of the quartz resonator. The quantity of exchangeable metal ions removed from the thin film materials and the quantity of other metal ions introduced therein were estimated from changes in the frequency of quartz resonators. The quartz resonator is known as microbalance and is used as devices capable of detecting the weight of thin films formed on the electrode surfaces thereof to a precision of $10^{-9}$ g.

The quartz resonators with coated gold electrodes were washed with a piranha solution (a 3:1 mixed solution of aqueous solutions of 96 percent sulfuric acid and 30 percent hydrogen peroxide), rinsed with pure water, and immersed for 12 h in 10 mM mercaptoethanol solution to introduce hydroxyl groups onto the surface, rinsed with ethanol, and blowed with nitrogen gas to achieve thorough drying. The frequency of the quartz resonator at that time was adopted as the reference value and the change in weight of the thin film was estimated from the change in frequency ($-\Delta F$) accompanying subsequent thin film formation.

The composition of the composite metal compound was determined by X-ray photoelectron spectrometry (XPS). Further, the shape of the thin film material obtained was evaluated by observation by scanning electron microscopy (SEM) or transmission electron microscopy (TEM).

Embodiment 1

Magnesium ethoxide and titanium butoxide were employed to manufacture a composite metal oxide thin film by Method A as Embodiment 1. In the present embodiment, nanopores were formed in a matrix of porous titania. However, similar thin film materials have been obtained employing other metal oxides such as zirconia. An 11.4 mg quantity of magnesium ethoxide ($Mg(OCH_2CH_3)_2$) was dissolved in 10 mL of 2-ethoxyethanol, 0.353 mL of titanium butoxide ($Ti(O"Bu)_4$) was added, and the mixture was stirred. A quartz resonator was immersed for 10 min in this solution at 25° C., rinsed by immersion for 1 min in toluene at 25° C., and blown dry with nitrogen gas. The quartz resonator was then left standing in air for about 20 min until the frequency of the quartz resonator stabilized to hydrolyze the metal alkoxide compounds chemically adsorbed to the solid surface, and the frequency of the quartz resonator was measured. This thin film formation step was repeated to form a composite metal oxide thin film. Next, the quartz resonator having the composite metal oxide thin film on its surface was immersed for 10 min in a hydrochloric acid aqueous solution of pH 4, immersion rinsed for 2 min in ion-exchange water, and dried by blowing with nitrogen gas. The frequency of the quartz resonator was then measured. The quartz resonator was then immersed for 10 min in a sodium hydroxide aqueous solution of pH 10 and dried by blowing with nitrogen gas. The frequency of the quartz resonator was then measured. The quartz resonator having on its surface the composite metal oxide thin film manufactured in this manner was then immersed in an aqueous solution containing various metal salts.

FIG. 1 shows the amount of reduction in the frequency of the quartz resonator due to the stacking of the composite metal oxide thin films of Embodiment 1. As indicated in the figure, the frequency of the quartz resonator decreased in proportion to the stacking of composite metal oxide thin films. This result indicates that in the method of the present embodiment, a composite metal oxide thin film of certain weight was successively formed on the electrode surface of the quartz resonator.

The change in frequency ($-\Delta F$) after eight cycles was 1,217 Hz. Following immersion in a dilute hydrochloric acid aqueous solution and sodium hydroxide treatment, the frequency increased by 141 Hz. This indicates the removal of the magnesium ions from the composite metal oxide thin film of the present embodiment and the introduction of sodium ions.

Figure 2:
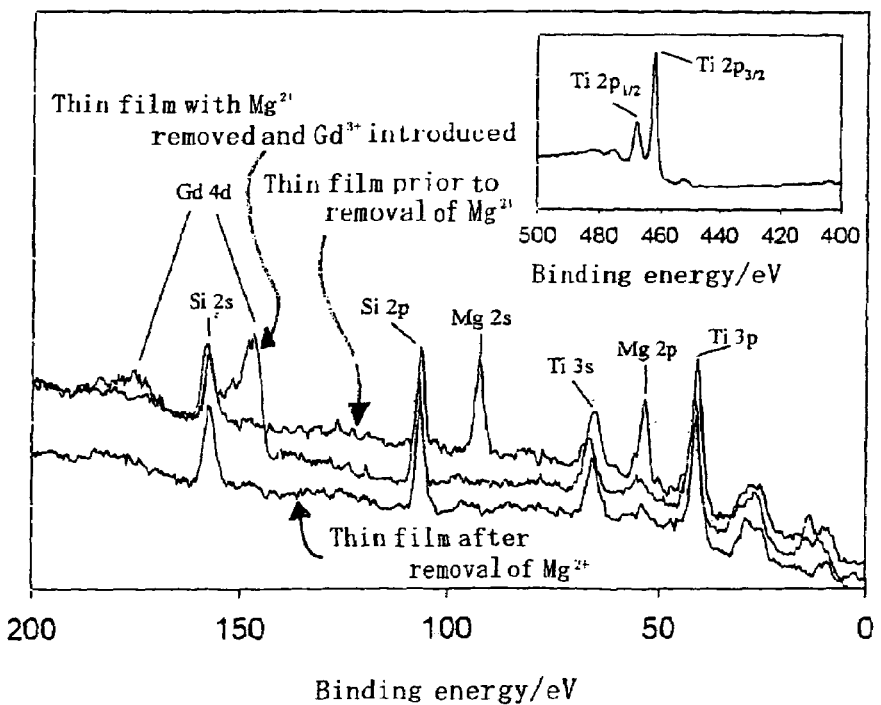
FIG. 2 shows XPS spectra before and after the removal of magnesium ions and following the introduction of gadolinium ions in the composite metal oxide thin film of Embodiment 1.

FIG. 2 shows the XPS spectra of a thin film material of composite metal oxide containing magnesium ions manufactured by the method of Embodiment 1 on a quartz substrate, the thin film material following treatments with dilute hydrochloric acid aqueous solution and sodium hydroxide aqueous solution, and the thin film thus treated and subsequently immersed for 4 h in a 10 mM gadolinium nitrate aqueous solution. These results indicate that the method of the present embodiment reliably formed a titania ultra thin film containing magnesium ions, and that the dilute hydrochloric acid and sodium hydroxide treatments removed the magnesium ions. They also show that the immersion in gadolinium aqueous solution introduced gadolinium ions into the thin film. There was no change in the peak intensities of the titania atoms before and after these steps, indicating that the structure of the amorphous titania thin film matrix was preserved. No nitrogen atoms of nitric acid ions ($NO_3^-$) derived from gadolinium nitrate were observed in the XPS spectra. Thus, it is clear that the gadolinium ions were introduced by ion exchange in the present embodiment.

Figure 3:
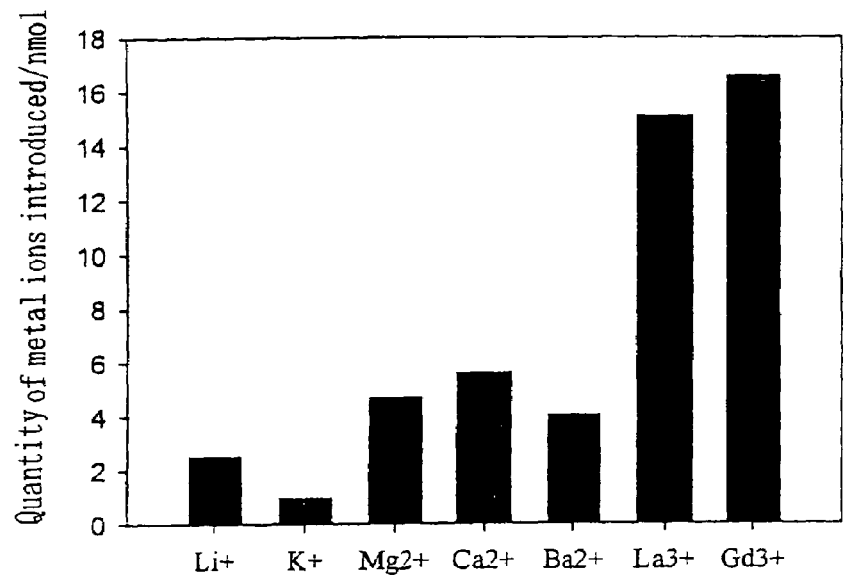
FIG. 3 is a chart showing the introduction levels of various metal ions into the composite metal oxide thin film of Embodiment 1.

FIG. 3 shows the quantities of metal ions introduced by immersion in aqueous solutions of various metal ions when the magnesium ions were removed by dilute hydrochloric acid and sodium hydroxide treatments from thin film materials of composite metal oxides containing magnesium ions manufactured by the method of Embodiment 1 on quartz substrates. The metal salts employed were $LiNO_3$, $KNO_3$, $Mg(NO_3)_2$, $Ca(NO_3)_2$, $Ba(NO_3)_2$, $La(NO_3)_3$, and $Gd(NO_3)_2$. The concentration was 10 mM in all cases, and the immersion period was 20 min. In all of these tests, the quartz resonator of FIG. 1 was employed. After the various metal ion incorporation tests, the incorporated metal ions were removed by dilute hydrochloric acid and sodium hydroxide treatments, and the samples were employed in the subsequent metal ion incorporation tests. As will be apparent in FIG. 3, the incorporation of metal ions was selective, with the quantity incorporated increasing with the charge. These results indicate that it was possible for the metal oxide thin films manufactured by the steps of the present embodiment to selectively remove specific metal ions from the aqueous solutions.

Figure 4:
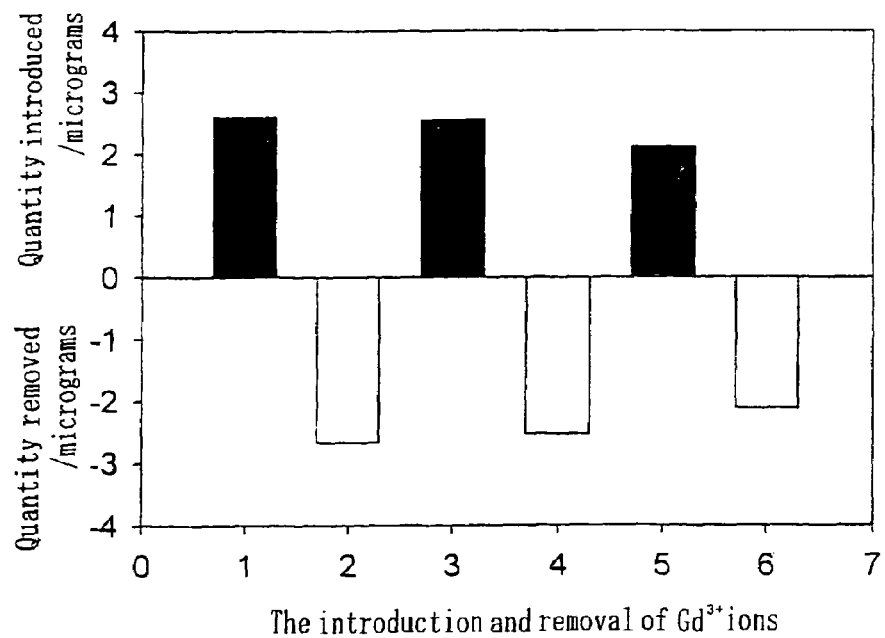
FIG. 4 is a chart showing the levels of removal and introduction with repeated introduction and removal of gadolinium ions in the composite metal oxide thin film of Embodiment 1.

The metal ions introduced by the above-described steps can be removed by treatments with dilute hydrochloric acid and sodium hydroxide. Magnesium was removed by treatments with dilute hydrochloric acid and sodium hydroxide from the thin film material of composite metal oxides containing magnesium ions manufactured by the method of Embodiment 1 on a quartz resonator. FIG. 4 shows the quantity of gadolinium ions introduced when the resonator was immersed for 20 min in a 10 mM aqueous solution of gadolinium nitrate and rinsed by immersion for 2 min in ion-exchange water; the quantity of gadolinium ions removed when the resonator was immersed for 10 min in an aqueous solution of hydrochloric acid of pH 4, rinsed by immersion for 2 min in ion-exchange water, immersed for 10 min in a sodium hydroxide aqueous solution of pH 10, and rinsed by immersion for 2 min in ion-exchange water; and the quantity of gadolinium ions introduced and removed when the above introduction and removal steps were repeated. As is apparent from the figure, the gadolinium ions introduced into the thin film were completely removed by the removal step. Further, when the introduction and removal steps were repeated, a quantity of gadolinium ions equal to the quantity introduced was removed. The quantity of gadolinium ions introduced the third time around was 80 percent of the quantity removed the first time around, indicating the structural stability of the amorphous metal oxide having nanopores of the present embodiment.

Figure 5:
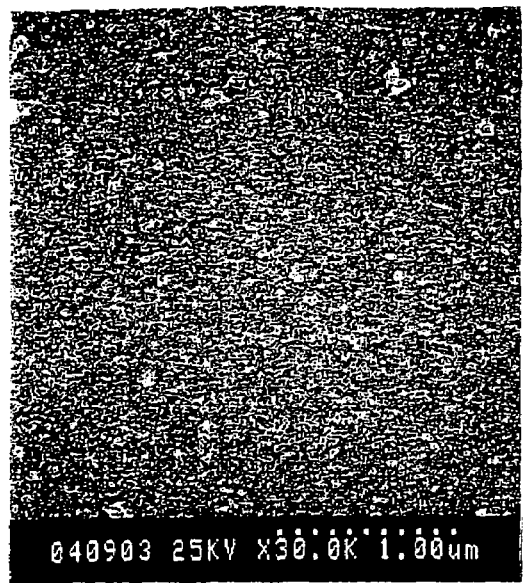
FIG. 5 is a scanning electron microscope photograph of the surface of a thin film following the introduction of barium ions into the composite metal oxide thin film of Embodiment 1.

FIG. 5 shows a photograph taken by scanning electron microscopy of the surface of a thin film after magnesium ions had been removed by treatments with dilute hydrochloric acid and sodium hydroxide from a thin film material of composite metal oxide comprising magnesium ions manufactured by the method of Embodiment 1 on a quartz substrate, the thin film had been immersed for 20 min in 10 mM barium nitrate aqueous solution, and the film had been rinsed by immersion in ion-exchange water and dried. The surface of the thin film was smooth and no change in the surface due to doping with barium ions was observed.

Embodiment 2

A compound metal oxide thin film was manufactured by Method B as Embodiment 2.

Titanium butoxide ($Ti(O^nBu)_4$) was dissolved to 100 mM in a 1:1 (vol/vol) mixed solution of toluene and ethanol. A quartz resonator was immersed for 3 min at 25° C. in this solution, rinsed by immersion for 1 min in ethanol at 25° C., and then immersed for 1 min in ion-exchange water at 25° C. to form a metal oxide thin film. This film was then dried by blowing with nitrogen gas. This step of forming a metal oxide thin film was repeated 5 times. The frequency of the quartz resonator was measured, The resonator was immersed for 1 min in an aqueous solution (0.1 mM) of europium nitrate (III) hexahydrate ($Eu(NO_3)_3(6H_2O)$), rinsed by immersion in ion-exchange water at 25° C. for 1 min, and blown dry with nitrogen gas, and then the frequency of the quartz resonator was measured. The steps of forming the metal oxide thin film and adsorbing the europium ions were then repeated to form a composite metal oxide thin film.

Figure 6:
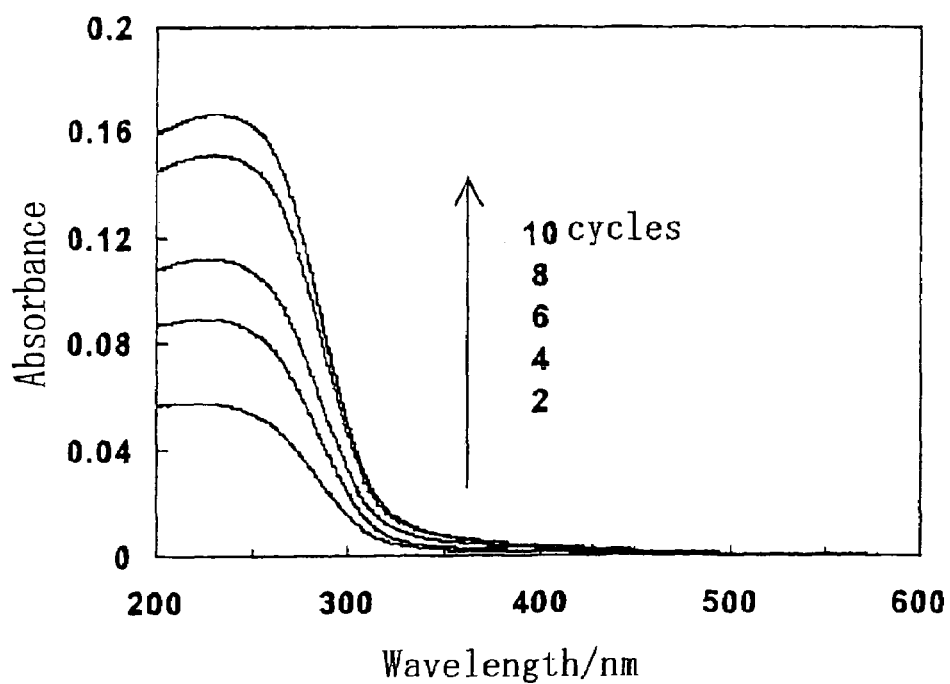
FIG. 6 is a graph showing changes in ultraviolet and visible absorption spectra based on stacking of the composite metal oxide thin film of Embodiment 2.

Ultraviolet and visible absorption spectra were measured to confirm the formation of the composite metal oxide thin film. Samples were obtained by adsorbing ten cycles of titanium butoxide and europium nitrate on a quartz substrate to form a composite metal oxide thin film. As shown in FIG. 6, absorbance due to the titania ultra-thin film was found near 230 nm, and the absorbance increased with the adsorption cycle. These results indicate that a composite metal oxide thin film on a solid surface was formed by the method of the present embodiment.

The quartz resonator having the composite metal oxide thin film on its surface was immersed for 10 min in aqueous hydrochloric acid at pH 4, immersed for 1 min in ion-exchange water, and dried by blowing with nitrogen gas. The frequency of the quartz resonator was measured. The quartz resonator was immersed for 10 min in an aqueous solution (0.1 mM) of lanthanum nitrate (III) hexahydrate ($La(NO_3)_3.6H_2O$), the quartz resonator was rinsed by immersion for 1 min in ion-exchange water, the resonator was blown dry with nitrogen gas, and the frequency of the quartz resonator was measured. The steps of adsorbing the lanthanum ions, rinsing away the excess adsorbed ions, and drying were repeated seven times.

Figure 7:
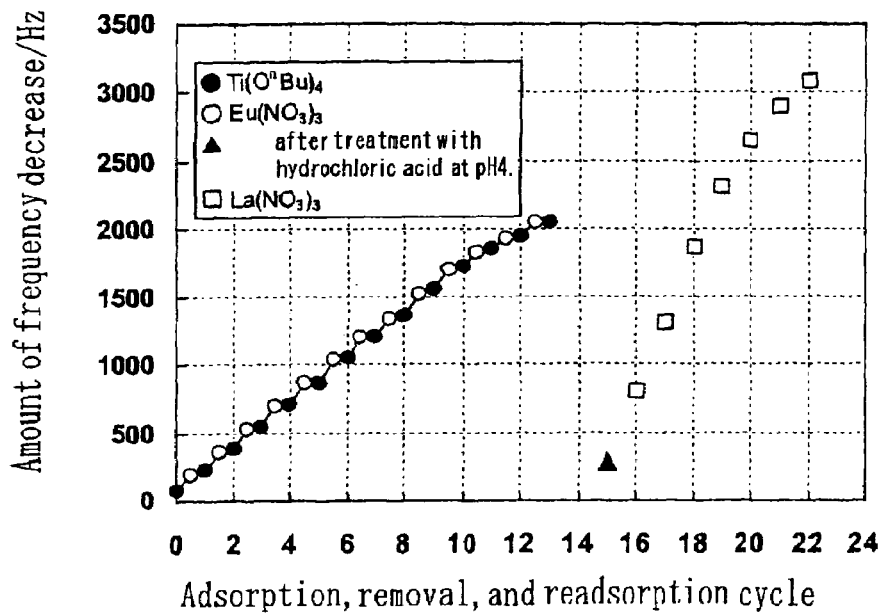
FIG. 7 is a graph showing the change in frequency of a quartz resonator based on stacking of the composite metal oxide thin film of Embodiment 2, the removal of europium ions, and the introduction of lanthanum ions.

FIG. 7 shows changes in the frequency of a quartz resonator in the series of steps of Embodiment 2. As indicated in the figure, the frequency of the quartz resonator decreased proportionately with stacking of the composite metal oxide thin film. These results indicate that the method of the present embodiment successively formed a composite metal oxide thin film of a certain weight on the electrode surface of the quartz resonator. The change in frequency after 13 cycles ($-\Delta F$) was 2,053 Hz. Further, the total reduction in value of the frequency due to adsorption of titanium butoxide was 291 Hz. The total reduction in value of the frequency due to adsorption of europium ions was 1,762. After immersion in a dilute hydrochloric acid solution, the frequency of the quartz resonator increased 1,765 Hz. These results indicate that magnitude of the total decrease in frequency was about the same as that due to adsorption of europium ions, indicating that the dilute hydrochloric acid treatment of the present embodiment removed europium ions. The total reduction in frequency due to adsorption of lanthanum ions was 2,802 Hz, indicating that it was possible to introduce other metal ions into the metal oxide thin film.

Embodiment 3

A composite metal oxide thin film was manufactured by Method C as Embodiment 3.

Titanium butoxide (Ti(O"Bu)$_4$) was dissolved to 100 mM in a 1:1 (vol/vol) mixed solution of toluene and ethanol, A quartz resonator was immersed for 3 min at 25° C. in this solution, rinsed by immersion for 1 min in ethanol at 25° C., immersed for 1 min in ion-exchange water at 25° C., and dried by blowing with nitrogen gas. This step was repeated 3 times to form a metal oxide thin film as a precursor film. The frequency of the quartz resonator was measured. The quartz resonator was immersed for 3 min in an aqueous solution (50 mM) of lanthanum nitrate (III) hexahydrate (La(NO$_3$)$_3$.6H$_2$O, rinsed by immersion in ion-exchange water at 25° C. for 1 min, and blown dry with nitrogen gas, and then the frequency of the quartz resonator was measured. The quartz resonator was then immersed for 5 min in a 50 mM aqueous solution of sodium silicate (Na$_2$SiO$_3$), rinsed by immersion for 1 min in ion-exchange water, and dried with nitrogen gas. These steps were repeated to manufacture a composite metal oxide thin film on the surface of the precursor film.

Figure 8:
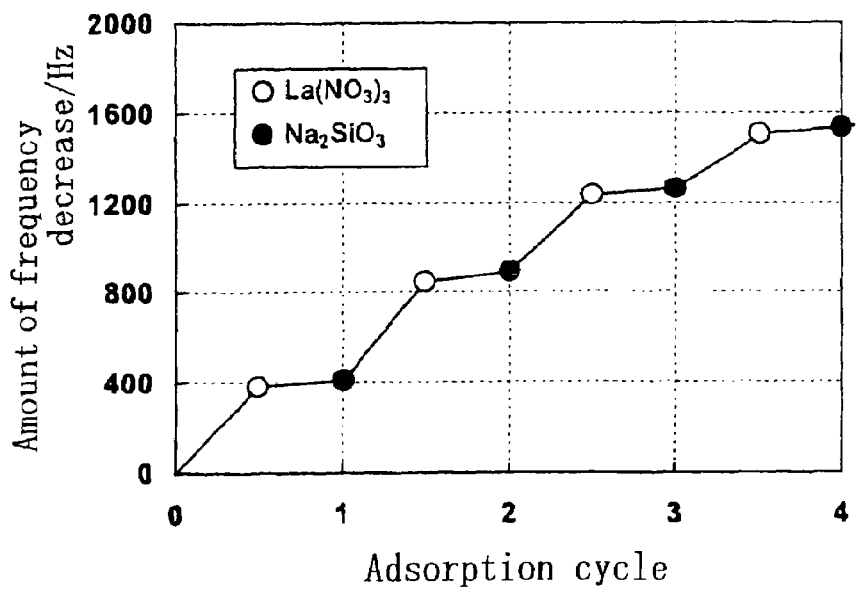
FIG. 8 is a graph showing the change in frequency of a quartz resonator based on stacking of thin films when a composite metal oxide thin film of lanthanum and silicate oligomer was fabricated on a thin film of titanium oxide in Embodiment 3.

As shown in FIG. 8, the frequency of the quartz resonator decreased in proportion to the number of adsorption cycles of the composite metal oxide thin film. These results indicate that the method of the present embodiment successively formed a composite metal oxide thin film of a certain weight on the electrode surface of the quartz resonator. The change in frequency ($-\Delta F$) after four cycles was 1,573 Hz. The total decrease in frequency due to La(NO$_3$)$_3$ adsorption was 1,393 Hz, and the total decrease in frequency due to adsorption of sodium silicate was 137 Hz.

A composite metal oxide thin film was fabricated on a quartz resonator not having a precursor film. The quartz resonator was immersed for 1 min in an aqueous solution (50 mM) of lanthanum nitrate (III) hexahydrate (La(NO$_3$)$_3$.6H$_2$O), rinsed by immersion for 1 min in ion-exchange water at 25° C., and dried by blowing with nitrogen gas. The frequency of the quartz resonator was measured. The quartz resonator was then again immersed for 3 min in a 50 mM aqueous solution of sodium silicate (Na$_2$SiO$_3$), rinsed by immersion for 1 min in ion-exchange water, and dried by blowing with nitrogen gas. The above step was repeated to manufacture a composite metal oxide thin film.

Figure 9:
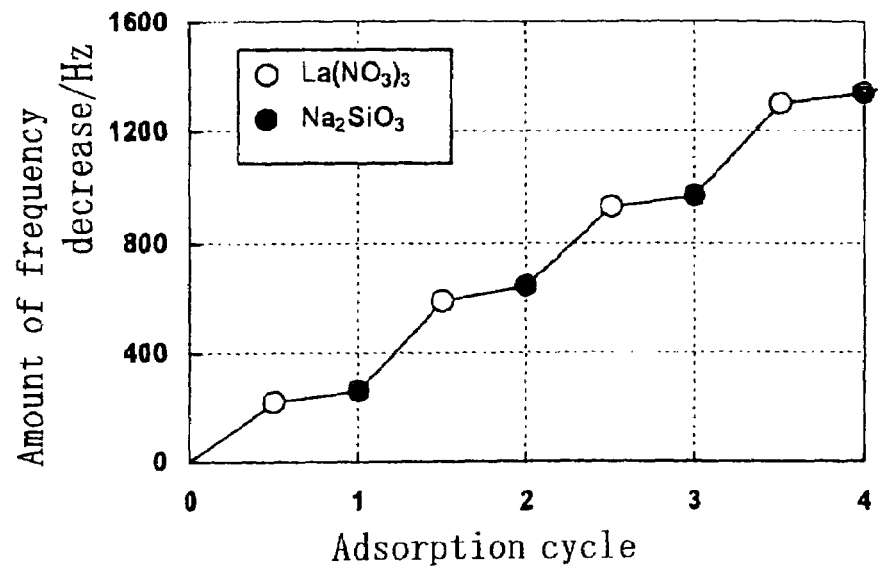
FIG. 9 is a graph showing the change in frequency of a quartz resonator based on the stacking of thin films when a composite metal oxide thin film of lanthanum and silicate oligomer was directly fabricated on the electrode surface of a quartz resonator modified with mercaptoethanol in Embodiment 3.

As shown in FIG. 9, the frequency of the quartz resonator decreased in proportion to the number of cycles of adsorption of composite metal oxide thin film. These results indicate that the method of the present embodiment successively formed a composite metal oxide thin film of certain weight on the electrode surface of the quartz resonator. The change in frequency ($-\Delta F$) after four cycles was 1,345 Hz. Further, the total decrease in frequency due to La(NO$_3$)$_3$ adsorption was 1,182 Hz and the total decrease in frequency due to sodium silicate adsorption was 163 Hz.

The following test was conducted to show the feasibility of manufacturing a composite metal oxide thin film by the above-described step on a cationic surface.

Figure 10:
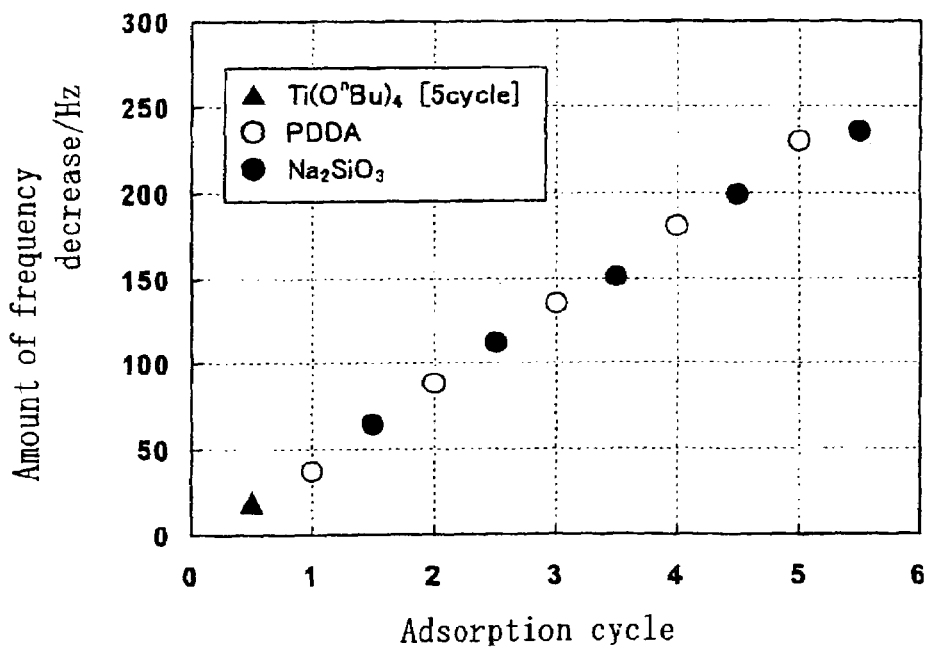
FIG. 10 is a graph showing the change in frequency of a quartz resonator based on the stacking of the composite metal oxide thin film of Embodiment 3.

Titanium butoxide (Ti(O"Bu)$_4$) was dissolved to 100 mM in a 1:1 (vol/vol) mixed solution of toluene and ethanol, a A quartz resonator was immersed for 3 min at 25° C. in this solution, and the quartz resonator was rinsed by immersion for 1 min in ethanol at 25° C., immersed for 1 min in ion-exchange water at 25° C., and dried by blowing with nitrogen gas. This step was repeated 5 times to form a metal oxide thin film as a precursor film. The frequency of the quartz resonator was measured. The quartz resonator was immersed for 3 min in an aqueous solution (10 mg/mL) polydimethyl diallylammonium chloride (referred to hereinafter as "PDDA"), rinsed by immersion for 1 min in ion-exchange water at 25° C., and blown dry with nitrogen gas. The frequency of the quartz resonator was measured. The quartz resonator was then again immersed for 3 min in a 50 mM aqueous solution of sodium silicate (Na$_2$SiO$_3$), rinsed by immersion for 1 min in ion-exchange water, and dried by blowing with nitrogen gas. The above step was repeated to manufacture an organic/inorganic metal oxide composite thin film. As shown in FIG. 10, the frequency of the quartz resonator decreased in proportion to the number of cycles of adsorption of organic/metal oxide nanocomposite thin film. The change in frequency ($-\Delta F$) after five cycles was 235 Hz Farther, the total decrease in frequency due to PDDA adsorption was 126 Hz and the total decrease in frequency due to sodium silicate adsorption was 90 Hz. These results indicate that the method of the present embodiment formed a composite metal oxide thin film of certain weight on the cationic surface.

Embodiment 4

A thin film material of composite metal oxide obtained by the method of the present invention was reduced to manufacture a thin film material containing a metal component as Embodiment 4.

An 11.4 mg quantity of magnesium ethoxide (Mg(OCH$_2$CH$_3$)$_2$) was dissolved in 10 mL of 2-ethoxyethanol, 0.353 mL of titanium butoxide (Ti(O"Bu)$_4$) was added and the mixture was stirred. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen. The quartz plate was immersed for 4 h in a 10 mM aqueous solution of silver nitrate, rinsed by immersion for 1 min in ion-exchange water, and dried by blowing with nitrogen. The quartz plate was then immersed for 1 min in a 200 mM aqueous solution of sodium borohydride (NaBH$_4$) to reduce the silver ions in the thin film and thus manufacture a thin film material containing a metal component.

Figure 11:
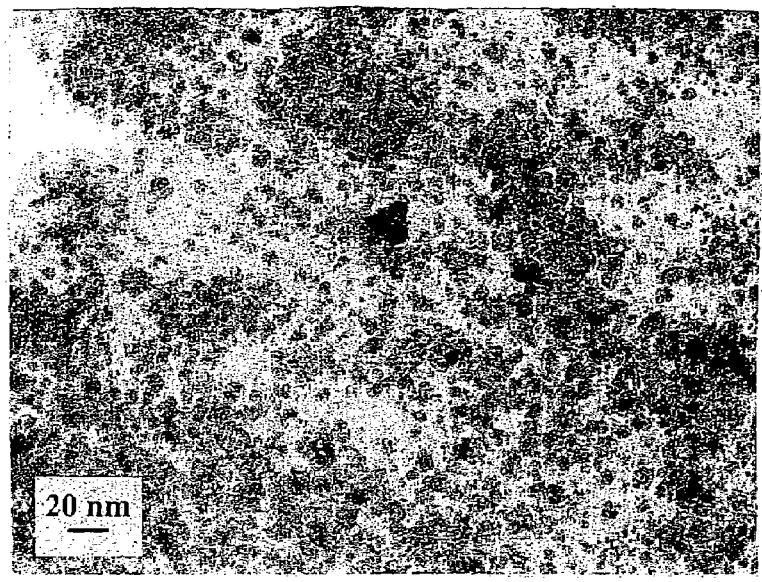
FIG. 11 is a transmission electron microscope photograph of a composite metal oxide thin film containing nanoparticles of silver in Embodiment 4.

FIG. 11 shows a transmission electron microscope photograph of the thin film material containing a metal component manufactured in Embodiment 4. Silver nanoparticles of about 5 to 20 nm in diameter were formed as confirmed by electron beam diffraction.

Embodiment 5

A thin film material of composite metal oxides obtained by the method of the present invention was reacted to manufacture a thin film material containing a metal chalcogenite component as Embodiment 5.

An 11.4 mg quantity of magnesium ethoxide (Mg(OCH$_2$CH$_3$)$_2$) was dissolved in 10 mL of 2-ethoxyethanol, 0.353 mL of titanium butoxide (Ti(O"Bu)$_4$) was added and the mixture was stirred. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen. The quartz plate was immersed for 4 h in a 10 mM aqueous solution of cadmium nitrate, rinsed by immersion for 1 min in ion-exchange water, and dried by blowing with nitrogen. The quartz plate was then immersed for 20 min in a 1 weight percent aqueous solution of sodium sulfide ($Na_2S$) to react the cadmium ions in the thin film with S-ions and thereby manufacture a thin film material containing cadmium sulfide.

Figure 12:
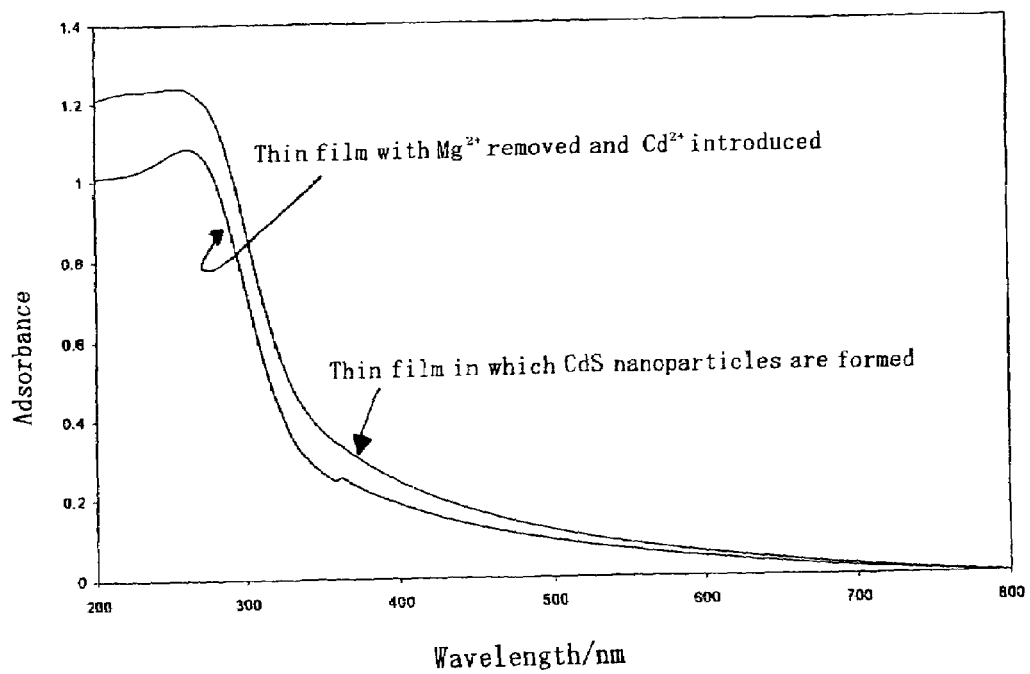
FIG. 12 is a graph showing ultraviolet and visible absorption spectra before and after the formation of nanoparticles of CdS in Embodiment 5.

FIG. 12 shows ultraviolet and visible light absorption spectra of the thin film incorporating cadmium ions and the thin film containing cadmium sulfide of Embodiment 5. Prior to the formation of cadmium sulfide, the thin film had an absorption peak characteristic of titania gel near 280 nm. In the thin film in which cadmium sulfide was formed, absorbance from 200 to 300 nm increased and the absorption edge red-shifted by about 20 nm. The absorption edge of cadmium sulfide is known to correspond to the size of the nanoparticles. In Embodiment 5, the formation of CdS nanoparticles about 10 to 20 nm in diameter was confirmed.

Embodiment 6

A thin film material of composite metal oxides obtained by the method of the present invention was heat treated to manufacture a thin film material in which the ion-exchange capability of the exchangeable metal ions was reduced as Embodiment 6.

A 11.4 mg quantity of magnesium ethoxide (Mg($OCH_2CH_3$)$_2$) was dissolved in 10 mL of 2-ethoxyethanol, 0.353 mL of titanium butoxide (Ti($O^nBu$)$_4$) was added and the mixture was stirred. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen.

Composite metal oxide thin films were manufactured on two quartz plates by the above-described step and one plate alone was heat treated for 30 min at 450° C. in air. Both plates were immersed for 4 h in a 10 mM aqueous solution of barium nitrate and the quantity of barium ions introduced was evaluated by XPS measurement.

XPS measurement of the sample that had not been exposed to the heat treatment revealed a composition ratio of barium to titanium of Ba/Ti=1.4. XPS measurement of the sample that had been heat treated revealed a composition ratio of barium to titanium of Ba/Ti=0.14. These results show that the heat treatment reduced the ion-exchange capability of exchangeable metal ions (sodium ions in this example) in the composite metal oxides.

Embodiment 7

The thin film material of composite metal oxides obtained by the method of the present invention was reduced to manufacture a thin film material containing a metal component as Embodiment 7. Embodiment 4 has already shown that a thin film material containing silver nanoparticles can be obtained by reducing a thin film material containing monovalent silver ions. Embodiment 7 gives an example of the manufacturing of a thin film material containing a metal component by reducing metal ions other than monovalent metal ions.

A 11.4 mg quantity of magnesium ethoxide (Mg($OCH_2CH_3$)$_2$) was added to 10 mL of 2-ethoxyethanol and dissolved by stirring for 5 days. A 0.353 mL quantity of titanium butoxide (Ti($O^nBu$)$_4$) was added and the mixture was stirred for 1 h. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen. The quartz plate was immersed for 4 h in a 10 mM aqueous solution of palladium nitrate, rinsed by immersion for 1 min in ion-exchange water, and dried by blowing with nitrogen. The quartz plate was then exposed for 5 sec with a 10 W hydrogen plasma (170 mTorr) to reduce the palladium ions present in the thin film, thereby manufacturing a thin film material containing a metal component.

Figure 13:
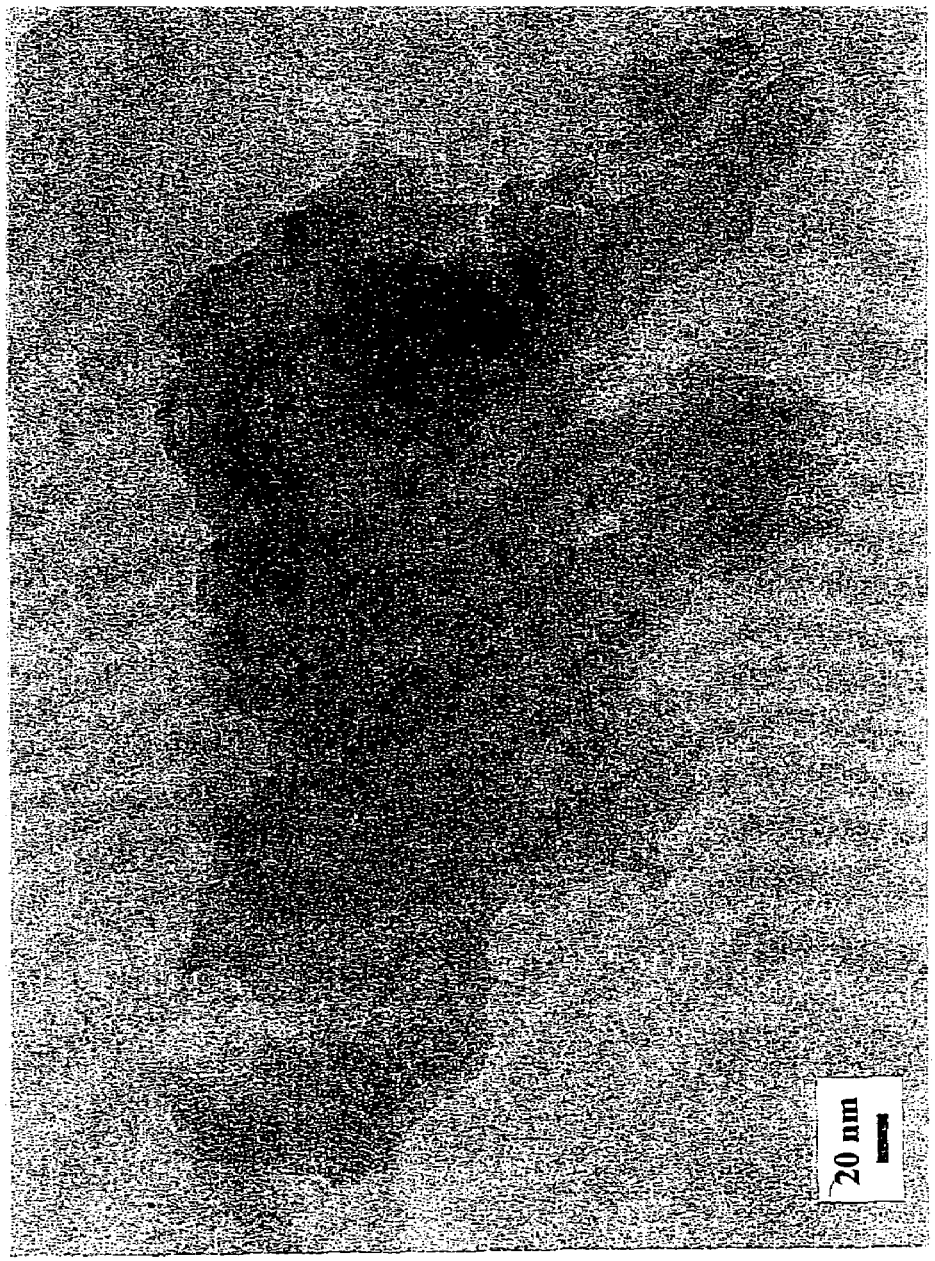
FIG. 13 is a transmission electron microscope photograph of a composite metal oxide thin film containing nanoparticles of palladium in Embodiment 7.

FIG. 13 shows a transmission electron microscope photograph of the thin film material containing a metal component of Embodiment 7. Nanoparticles of from 3 to 7 nm in diameter were formed in the thin film. The fact that palladium particles had been formed in the thin film was confirmed by changes in absorbance in the UV spectrum.

Embodiment 8

Multiple metal ions were introduced into the thin film material of composite metal oxides obtained by the method of the present invention to manufacture a thin film material incorporating two or more metal ion components as Embodiment 8.

A 11.4 mg quantity of magnesium ethoxide (Mg($OCH_2CH_3$)$_2$) was added to 10 mL of 2-ethoxyethanol and dissolved by stirring for 5 days. A 0.353 mL quantity of titanium butoxide (Ti($O^nBu$)$_4$) was added and the mixture was stirred for 1 h. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen. The quartz plate was immersed for 4 h in an aqueous solution comprising 10 mM each of cobalt nitrate and silver nitrate, rinsed by immersion for 1 min in ion-exchange water, and dried by blowing with nitrogen.

Figure 14:
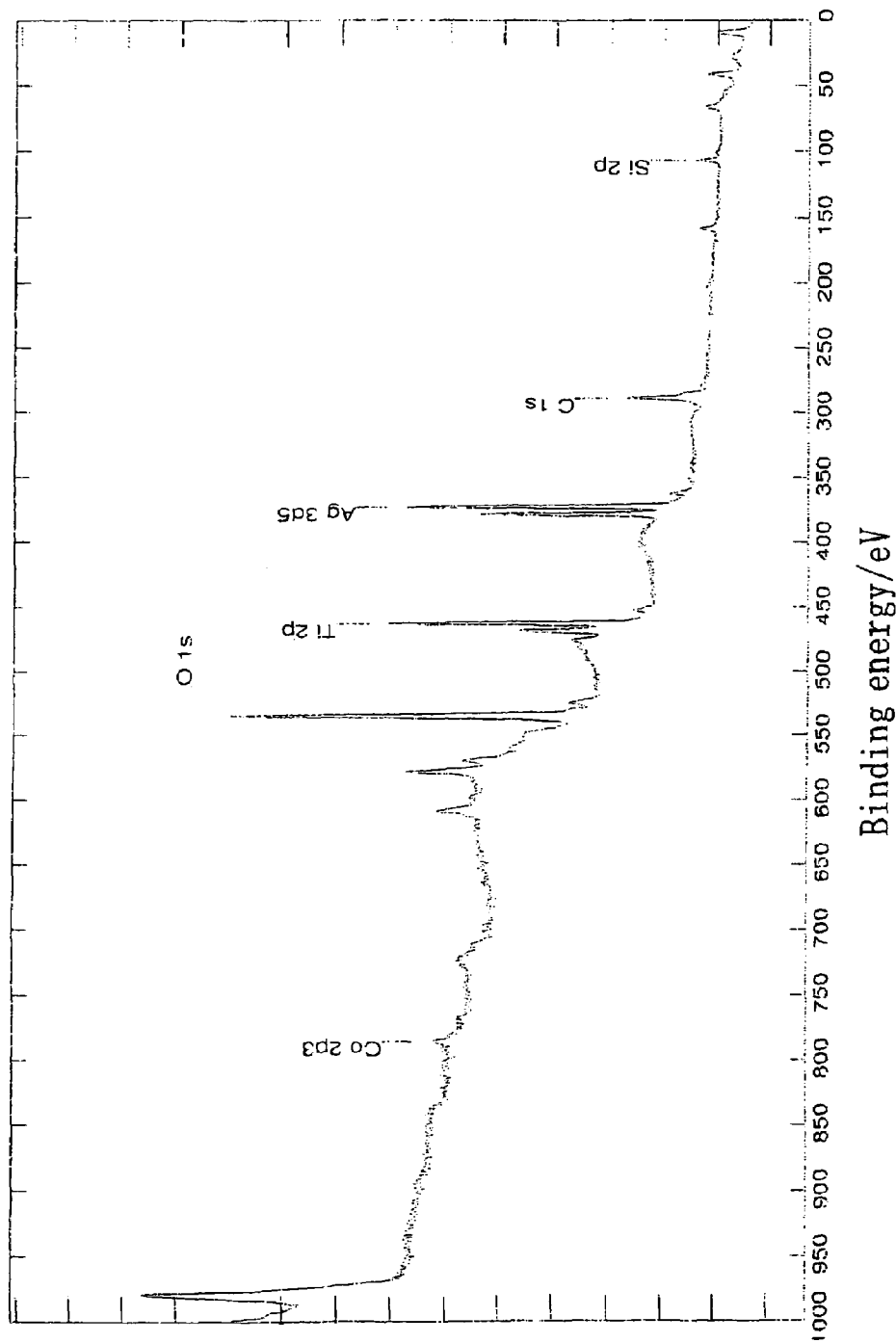
FIG. 14 is a graph showing an XPS spectrum of the thin film material of Embodiment 8.

FIG. 14 shows an XPS spectrum of the thin film material manufactured by the method of Embodiment 8. These results indicate that a titania ultra-thin film containing cobalt ions and silver ions was obtained by the method of the present embodiment. The compositional ratio of metal ions as calculated from the peak intensities in the XPS spectrum was titanium:silver:cobalt=1:0.52:0.88.

Embodiment 9

A nanomaterial of composite metal oxides having a granular shape was manufactured by the method of the present invention as Embodiment 9.

A 0.068 quantity of magnesium ethoxide $(Mg(O-Et)_2)$ was dissolved in 60 mL of 2-propanol and stirred for 5 days. To this were added 2.042 mL of titanium butoxide $(Ti(O^nBu)_4)$ and the mixture was stirred for several hours. The composition of this mixed solution comprised a 100 mM concentration of titanium butoxide and a 10 mM concentration of magnesium ethoxide. A 0.054 mL quantity of ion-exchange water was added to 30 mL of this solution and the mixture was stirred for several hours. A 0.2 mL quantity of hydrochloric acid (2 N) aqueous solution was added to 20 mL of this solution to remove the magnesium ions. A solution of 0.032 g of sodium hydroxide in 0.8 mL of methanol was added. When the sodium hydroxide was added, the solution become a milk-white suspension.

Figure 15:
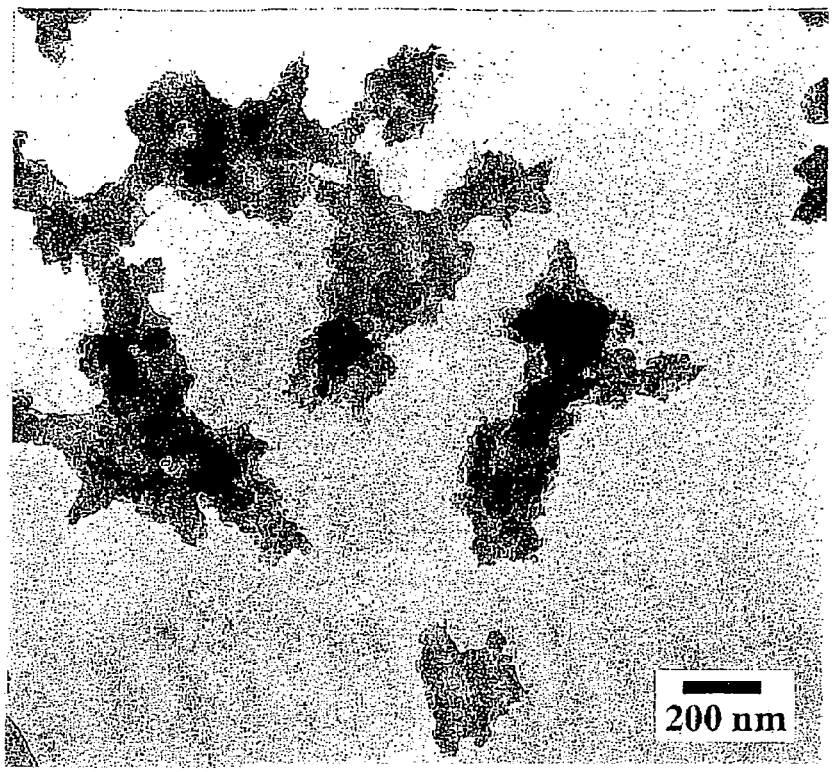
FIG. 15 is a transmission electron microscope photograph of microparticles present in a suspension in Embodiment 9.

FIG. 15 shows the results of observation by transmission electron microscopy of the structure of fine particles present in the suspension. Nanoparticles with diameters of from 100 to 200 nm were formed in the solution.

The suspension was stirred overnight, 10 mL thereof was divided out and separated in a centrifuge (10,000 rpm, 20 min), and the solid was collected. The elemental composition of the powder obtained was confirmed with an EDX spectrum. The results were: carbon: 8.3 weight percent; oxygen: 42.3 weight percent; sodium: 7.8 weight percent; magnesium: 0.3 weight percent; and titanium: 41.3 weight percent. These results indicate that the nanoparticles of the composite metal oxides can be reliably formed by the step of the present embodiment.

A 0.2598 g quantity of a solution of lanthanum nitrate $(La(NO_3)_3 \cdot (6H_2O))$ in 1 mL of ethanol was added to the remainder of the 10 mL after the above division. The mixture was left standing overnight, the solution was centrifugally separated, and the solid was collected. The elemental composition of the powder obtained was confirmed with an EDX spectrum. The results were: carbon: 6.2 weight percent; oxygen: 34.3 weight percent; sodium: 1.2 weight percent; magnesium: 0.1 weight percent; lanthanum: 25.3 weight percent; and titanium: 32.9 weight percent. These results indicate that the sodium ions that were present in the nanoparticles of composite metal oxides were replaced with lanthanum ions and a nanomaterial of composite metal oxides of new composition was formed.

Embodiment 10

The thin film material of composite metal oxides obtained by the method of the present invention was reduced to manufacture a thin film material containing metal nanoparticles, which was then reoxidized to manufacture a thin film material containing metal oxide nanoparticles as Embodiment 10. The reduction and oxidation steps were then repeated to alternately manufacture metal nanoparticles and metal oxide nanoparticles.

A 11.4 mg quantity of magnesium ethoxide $(Mg(OCH_2CH_3)_2)$ was added to 10 mL of 2-ethoxyethanol and dissolved by stirring for 5 days. A 0.353 mL quantity of titanium butoxide $(Ti(O^nBu)_4)$ was added and the mixture was stirred for 1 h. A quartz plate was immersed for 10 min at 25° C. in this solution, rinsed by immersion for 1 min in toluene at 25° C., dried by blowing with nitrogen gas, and then left standing in air for about 20 min to hydrolyze the metal alkoxide compound that had chemically adsorbed onto the solid surface. This thin film forming step was repeated 8 times to form a composite metal oxide thin film. Next, the quartz plate on the surface of which had been formed the composite metal oxide thin film was immersed for 10 min in pH 4 aqueous solution of hydrochloric acid, rinsed by immersion for 2 min in ion-exchange water, and dried by blowing with nitrogen. It was then immersed for 10 min in a pH 10 sodium hydroxide aqueous solution and dried by blowing with nitrogen. The quartz plate was immersed for 4 h in a 10 mM aqueous solution of silver nitrate, rinsed by immersion for 1 min in ion-exchange water, and dried by blowing with nitrogen. The quartz plate was then irradiated exposed for 150 sec with a 10 W hydrogen plasma (180 mTorr) to reduce the silver ions present in the thin film, thereby manufacturing a thin film material containing silver nanoparticles. The quartz plate was then further irradiated with a 10 W oxygen plasma (180 mTorr) to oxidize the silver nanoparticles in the thin film, thereby manufacturing a thin film material containing silver oxide nanoparticles. Six cycles of the hydrogen plasma treatment and oxygen plasma treatment were conducted.

Figure 16:
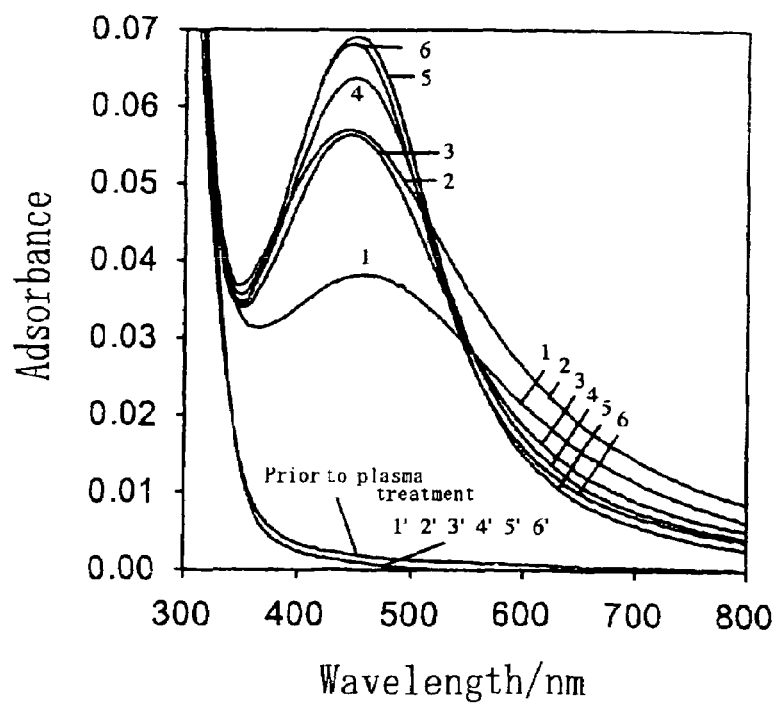
FIG. 16 shows ultraviolet and visible absorption spectra of a composite metal oxide thin film. It shows the alternate formation of composite metal oxide thin films containing nanoparticles of silver and composite metal oxide thin layers containing nanoparticles of silver oxide by alternately treating with hydrogen plasma and oxygen plasma in Embodiment 10.

FIG. 16 shows ultraviolet and visible light absorption spectra of the thin film material manufactured in Embodiment 10. In the samples subjected to reduction treatment (spectrum 1), an absorption peak derived from plasmon absorption of silver nanoparticles appears near 460 nm. In the oxidation treated thin film material (spectrum 1'), plasmon absorption completely disappears. When the hydrogen plasma treatment and oxygen plasma treatment were repeated, plasmon absorption appeared following hydrogen plasma treatment (spectra 2, 3, 4, 5, 6), and plasmon absorption completely disappeared following oxygen plasma treatment (spectra 2', 3', 4', 5', 6'). These results show that repeated reduction and oxidation alternately formed silver nanoparticles and silver oxide nanoparticles in the thin film material.

Figure 17:
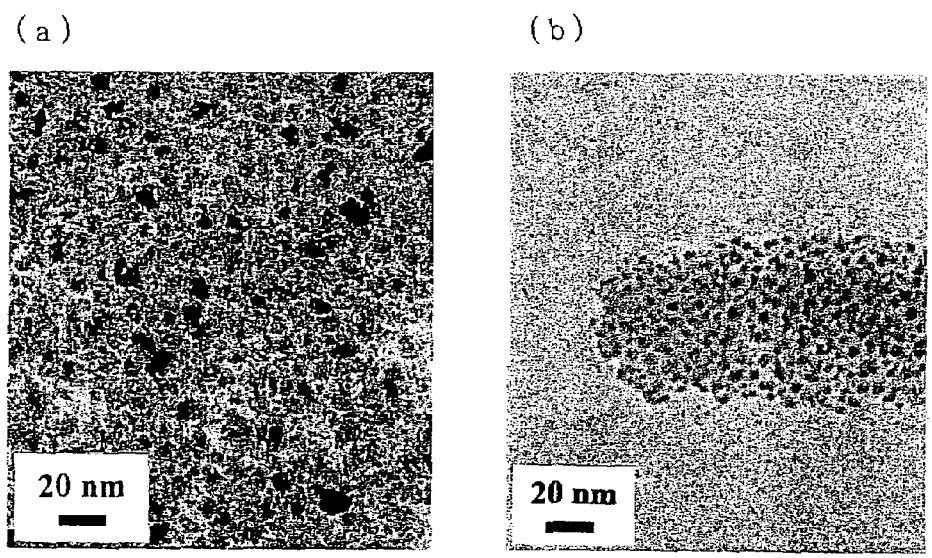
FIG. 17 shows a transmission electron microscope photograph of a composite metal oxide thin film containing the silver nanoparticles of Embodiment 10 (left) and a transmission electron microscope photograph of a composite metal oxide thin film containing silver oxide nanoparticles (right).

FIG. 17 shows a transmission electron microscope photograph of thin film material containing the silver nanoparticles (left) manufactured in Embodiment 10 and the thin film material containing silver oxide nanoparticles (right). A thin film material that had been through one cycle of hydrogen plasma treatment (corresponding to spectrum 1) and a thin film material that had been through six repeat cycles of hydrogen plasma treatment and oxygen plasma treatment were employed as samples. These results show that silver nanoparticles and silver oxide nanoparticles were reliably formed by the step of Embodiment 10.

Figure 18:
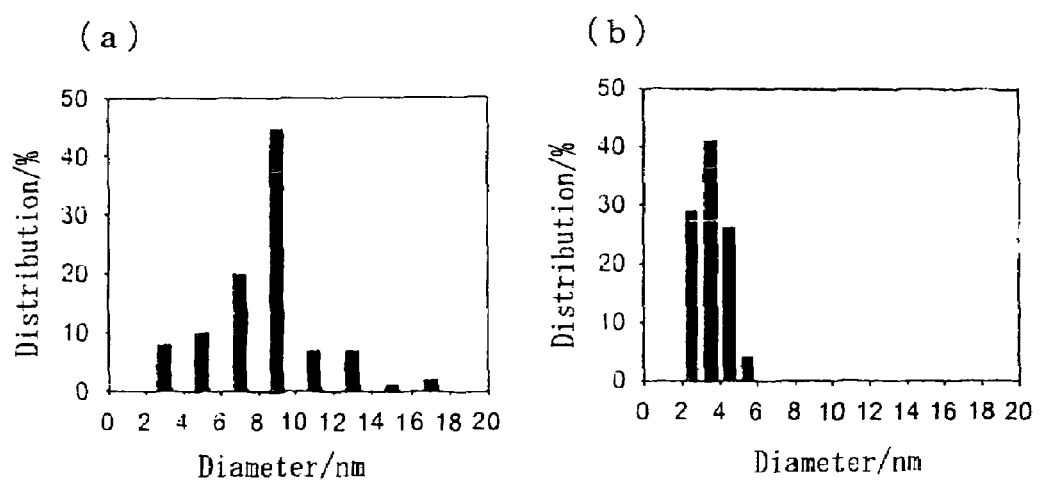
FIG. 18 shows charts of the particle size distribution of silver nanoparticles (left) and silver oxide nanoparticles (right) in the composite metal oxide thin film of Embodiment 10.

FIG. 18 presents histograms of the diameters of the nanoparticles observed in transmission electron microscope images (FIG. 17). The silver nanoparticles formed after the initial reducing step had an average particle size of 8.6 nm and a diameter standard deviation of 3.0 nm (left in FIG. 18). The silver oxide nanoparticles formed after six cycles of repeat reduction and oxidation treatments had an average particle size of 3.9 nm and a diameter standard deviation of 0.7 nm (right in FIG. 18). These results indicate that repeat reduction and oxidation treatments permit good control of the size and standard deviation of nanoparticles in thin film materials. The reduction/oxidation process in the thin film is an important method of controlling the microcomposition of the nanomaterial of metal oxides.

The present invention as described above permits the reliable formation with good thickness precision of thin film materials of composite metal oxides in the nanometer region over a broad range of compositions. Thus, the present invention can be employed over a wide range of technical areas.

The invention claimed is:

1. A method of producing a material comprising a substrate and a thin film of a nanomaterial formed on the substrate,
   wherein the nanomaterial satisfies at least one of the following conditions (a), (b), (c) or (d):
   (a) a nanomaterial of an amorphous metal oxide with uniformly distributed nanopores containing exchangeable metal ions, the nanopores in the metal oxide serving as a matrix being uniformly distributed throughout the entire nanomaterial;
   (b) a nanomaterial of amorphous metal oxide wherein the amorphous metal oxide has uniformly distributed nanopores capable of containing metal ions, and the nanopores in the metal oxide serve as a matrix being uniformly distributed throughout the entire nanomaterial;
   (c) a nanomaterial of amorphous metal oxide wherein the amorphous metal oxide has uniformly distributed nanopores capable of selectively containing specific metal ions, the nanopores in the metal oxide serving as a matrix being uniformly distributed throughout the entire nanomaterial;
   (d) a nanomaterial of amorphous metal oxide which comprises a metal oxide insoluble in acid amorphous solution with uniformly distributed nanopores containing metal ions soluble in acid aqueous solutions, the nanopores in the metal oxide serving as a matrix being uniformly distributed throughout the entire nanomaterial; and,
   wherein the method comprises conducting (i), (ii) and (iii) one or more times, and then conducting (iv):
   (i) bringing a mixed solution of a metal alkoxide compound capable of providing metal ions soluble in an acidic aqueous solution following hydrolysis and a metal alkoxide compound capable of providing metal oxide insoluble in water following hydrolysis into contact with the surface of a substrate having groups reactive with metal alkoxide groups of the two metal alkoxide compounds, wherein the two metal alkoxides are adsorbed on the surface;
   (ii) rinsing away excess metal alkoxide compounds;
   (iii) hydrolyzing the metal alkoxide compounds present on the substrate surface to form a thin film of a nanomaterial; and
   (iv) immersing the thin film of a nanomaterial in an acidic aqueous solution to remove at least a part of the metal ions soluble in the acidic aqueous solution.

2. The method of producing a material according to claim 1, wherein the nanomaterial has a thickness of from 0.5 to 100 nm.

3. The method of producing a material according to claim 1, wherein the substrate has positive electrical charges and some or all of the positive electrical charges are electrostatically bonded to the nanomaterial formed on the substrate.

4. The method of producing a material according to claim 1, wherein the substrate comprises groups that react with a silicate oligomer and some or all of the reactive groups are bonded to the nanomaterial formed on the substrate.

5. The method of producing a material according to claim 1, comprising conducting at least once the following (1) and (2) below in random order on the surface of the substrate having groups reactive with metal alkoxide groups:
   (1) bringing a solution of metal alkoxide compound capable of providing metal ions soluble in acidic aqueous solution following hydrolysis into contact with the surface of the substrate, rinsing away excess metal alkoxide compound, and then hydrolyzing the metal alkoxide compound present on the substrate surface to form a metal oxide thin film; and
   (2) bring a solution of metal alkoxide compound capable of providing metal oxide compound insoluble in acidic aqueous solution following hydrolysis into contact with the surface of the substrate, rinsing away the excess metal alkoxide compound, and hydrolyzing the metal alkoxide compound present on the substrate surface to form a metal oxide thin film.

* * * * *